(12) United States Patent
Taninai

(10) Patent No.: US 7,200,428 B2
(45) Date of Patent: Apr. 3, 2007

(54) PORTABLE TERMINAL

(75) Inventor: Minoru Taninai, Kanagawa (JP)

(73) Assignee: Sony Ericsson Mobil Communication Japan, Inc., Tokyo (JP)

( * ) Notice: Subject to any disclaimer, the term of this patent is extended or adjusted under 35 U.S.C. 154(b) by 573 days.

(21) Appl. No.: 10/470,142

(22) PCT Filed: Nov. 20, 2002

(86) PCT No.: PCT/JP02/12106

§ 371 (c)(1),
(2), (4) Date: Jul. 24, 2003

(87) PCT Pub. No.: WO03/047218

PCT Pub. Date: Jun. 5, 2003

(65) Prior Publication Data

US 2004/0248628 A1    Dec. 9, 2004

(30) Foreign Application Priority Data

Nov. 27, 2001  (JP) ............................. 2001-361092
Mar. 8, 2002   (JP) ............................. 2002-063635

(51) Int. Cl.
*H04M 1/00*   (2006.01)
*H04B 1/38*   (2006.01)

(52) U.S. Cl. .............................. 455/575.3; 455/575.4; 455/566; 455/575.1; 455/575.8

(58) Field of Classification Search ............ 455/575.3, 455/575.4, 566, 575.1, 575.8
See application file for complete search history.

(56) References Cited

U.S. PATENT DOCUMENTS 5,485,517 A * 1/1996 Gray ..................... 379/433.13
5,689,824 A * 11/1997 Nagai ...................... 455/575.3
6,850,784 B2 * 2/2005 SanGiovanni ............ 455/575.3

FOREIGN PATENT DOCUMENTS

| JP | 1-319348 | 12/1989 |
|---|---|---|
| JP | 5-136859 | 6/1993 |
| JP | 5-211547 | 8/1993 |
| JP | 7-38945 | 2/1995 |
| JP | 7-95651 | 4/1995 |
| JP | 7-202748 | 8/1995 |

(Continued)

*Primary Examiner*—Quochien B. Vuong
*Assistant Examiner*—Wen Huang
(74) *Attorney, Agent, or Firm*—Frommer Lawrence & Haug LLP; William S. Frommer; Paul A. Levy

(57) ABSTRACT

To improve usability while maintaining miniaturization, in a portable terminal device in which one end part of a first housing having an operating part and one end part of a second housing having a display part are turnably connected by a hinge part, an open state where the surface of the display part and the surface of the operating part are opened at a predetermined angle is formed by turning the first housing or the second housing by the hinge part from a close state where the first housing and the second housing are overlapped with each other and the operating part surface and the display part surface are facing to the same direction, and the hinge part has tilt angle changing means that is tiltably supported to the first housing or the second housing and can change the angle in the open state.

13 Claims, 44 Drawing Sheets

FOREIGN PATENT DOCUMENTS

| | | |
|---|---|---|
| JP | 7-288860 | 10/1995 |
| JP | 2000-101263 | 4/2000 |
| JP | 2002-135380 | 5/2002 |
| JP | 2002-158758 | 5/2002 |
| JP | 2002-344596 | 11/2002 |

* cited by examiner

PORTABLE TERMINAL

TECHNICAL FIELD

The present invention relates to a portable terminal device, and more particularly, relates to the technical field of a portable terminal device in which a first housing having a microphone part and a second housing having a speaker part are connected via a hinge shaft in freely turnable to the shaftwise direction of said hinge shaft.

BACKGROUND ART

Portable terminal devices, for example, portable wireless telephone sets have been popularized by the development of mobile telephone systems in recent years. In portable wireless telephones sets, there is a type in which a first housing having a microphone part and a second housing having a speaker part are turnably connected via a hinge shaft, however, as such type of portable wireless telephone sets, some are designed so that the first housing and the second housing are turnably connected to the shaftwise direction of the hinge shaft, and the microphone part and the speaker part face to the same direction in a close state where the second housing is lying on the first housing (for example, see patent document 1).

As shown in FIGS. 38 and 39, in such a conventional portable wireless telephone set "a", a first housing "c" having a microphone part "b" and a second housing "e" having a speaker part "d" are turnably connected via a hinge shaft "f", and if the second housing "e" is turned to the first housing "c" from the close state where the second housing "e" is lying on the first housing "c" in the thickness direction (see FIG. 39), the portable wireless telephone set "a" becomes an open state (see FIG. 38) and becomes available for communication.

In the portable wireless telephone set "a", a main operating part "g" having plural operation keys is provided on the surface of the first housing "c" on the side that touches the second housing "e", and a display part "h" and a suboperating part "i" are provided on the opposite side. In this manner, in the portable wireless telephone set "a", since the suboperating part "i" is provided on the surface on the opposite side of the second housing "e" to the side that touches the first housing "c", the user can perform predetermined operations by operating the suboperating part "i" in both states of the open state and the close state.

On the other hand, as a further developed device from the said portable wireless telephone set "a", there is an open/close type portable information terminal designed so that the angle of a housing having an operating part corresponding to the first housing "c" and a housing having a display part corresponding to the second housing "e" in the said open state becomes a predetermined angle θ; 180° or less (for example, see patent document 2).

patent document 1: patent application publication, publication number 07(1995)-288860 patent document 2: patent application publication, publication number 2002-158758 (p. 3, FIGS. 2 and 6)

However, in the said portable wireless telephone-set "a" (patent document 1), in the open state, it becomes the state where the first housing "c" and the second housing "e" are connected in almost straight and the shape is not along the outline of the caller's face when the caller performs communication; if the caller gets close to his/her mouth to the microphone part "b", his/her ear gets away from the speaker part "d" (see FIG. 40), and reverse, if the caller gets close the ear to the speaker part "d", the microphone part "b" gets away from the mouth (see FIG. 41): there is a problem that the usability is not good in both cases.

Then, to improve the usability, it can be considered that as a portable wireless telephone set a' shown in FIGS. 42 and 43, a projecting part "j" is provided by making the part having the microphone part "b" in the first housing "c" project, however, since the projecting-part "j" is provided, the length of the first housing "c" becomes longer: it causes a problem that the portable wireless telephone set "a" becomes a large size.

Note that, this large size problem similarly arises also in the case where the part having the speaker part "d" in the second housing "e" is projected, without projecting the part having the microphone part "b" in the first housing "c".

Furthermore, to improve the usability, as a portable wireless telephone set a" shown in FIG. 44, it can be considered that the hinge shaft "f" is tilted to the first housing "c", so that the second housing "e" tilts to the first housing "c", however, in this case, since the second housing "e" is tilted, it is necessary that the hinge shaft "f" is longer, and a large gap generates between the first housing "c" and the second housing "e": the hinge shaft "f" is apt to get a large load, and the whole of the portable wireless telephone set a" becomes a large size.

On the other hand, in the said open/close type portable information terminal (patent document 2), the end part of the display part housing having the speaker and the end part of the operating part housing having the microphone are connected by a connecting member serving as a turning mechanism, and it is designed so that, in the state where the display part housing and the operating part housing are opened, they form a predetermined angle θ (180° or less), thereby, when the user performs communication, user's ear and mouth get close to the speaker and the microphone, respectively: the usability is improved.

However, although the open/close type portable information terminal is designed so that, in the state where the display part housing and the operating part housing are opened, they form a predetermined angle θ (180° or less), also there is a problem that if force is applied to the display part housing, the connecting member receives excessive load and is apt to be broken.

DESCRIPTION OF THE INVENTION

A portable terminal device according to the present invention aims to maintain the miniaturization of the said portable terminal device, and to prevent breakage by a load.

To obviate the aforementioned problem, in a portable terminal device in which one end part of a first housing having an operating part and one end part of a second housing having a display part are turnably connected by a hinge part, an open state where the surface of the display part and the surface of the operating part are opened at a predetermined angle is formed by turning the first housing or the second housing by the hinge part from a close state where the first housing and the second housing are overlapped with each other and the surface of the operating part and the surface of the display part are facing to the same direction, and the hinge part has tilt angle changing means tiltably supported to the first housing or the second housing and can change the angle in the open state.

Accordingly, in the portable terminal device according to the present invention, even if load is charged on the first housing and the second housing when the open state where the first housing and the second housing are mutually tilted via the hinge part is formed, the angle formed by the first housing and the second housing in the said open state can be changed by the tilt angle changing means, thereby, the breakage of the first housing and the second housing by the said load can be prevented, and a separation between the first housing and the second housing can be prevented.

BEST MODE FOR CARRYING OUT THE INVENTION

Figure 1:
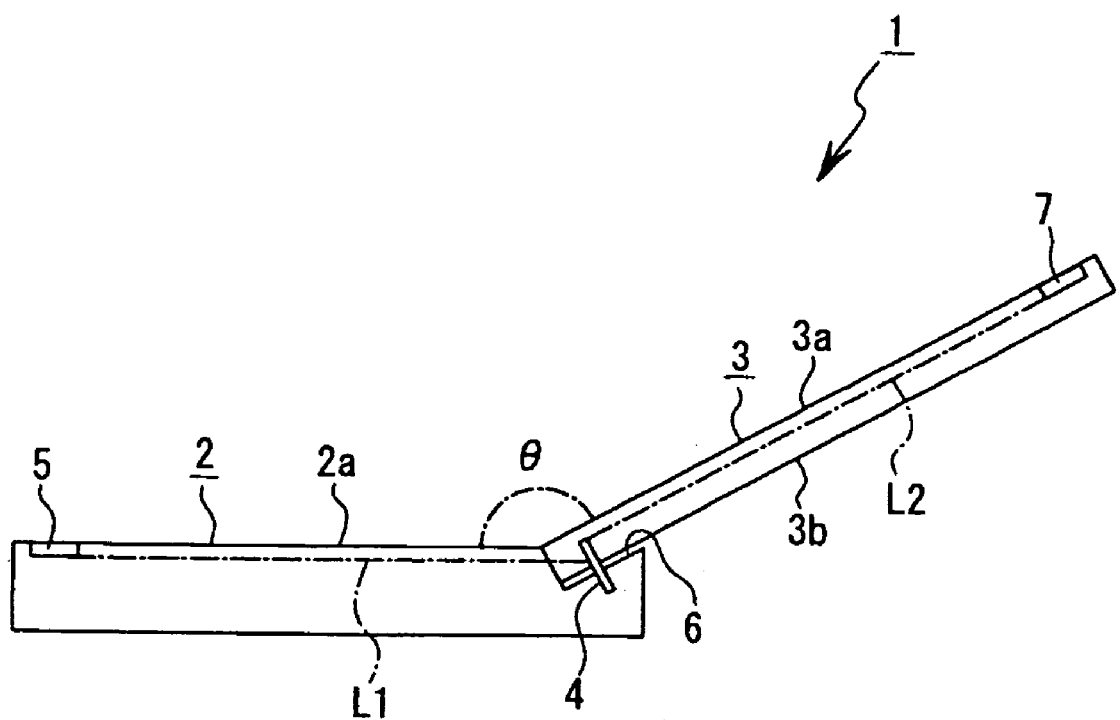
FIG. 1 is a side view illustrating a state to show the concept of a portable terminal device.

An embodiment of the present invention will be described in detail with reference to the accompanying drawings. Note that, each embodiment shown in below is that the present invention has been applied to a portable wireless telephone set.

First, the concept of the present invention will be described (see FIGS. 1 and 2).

A portable wireless telephone set 1 is formed by that a first housing 2 and a second housing 3 are connected via a hinge shaft 4 turnably to the shaftwise direction. In the first housing 2, at one end part of one surface 2a, a positional locating concave part 6 is formed, and at the other end part of one surface 2a, a microphone part 5 is provided. At the other end part of one surface 3a of the second housing 3, a speaker part 7 is provided.

In the first housing 2 and the second housing 3, the respective one end parts are connected via the hinge shaft 4, and the said hinge shaft 4 is designed to be always tilted to the first housing 2.

Figure 2:
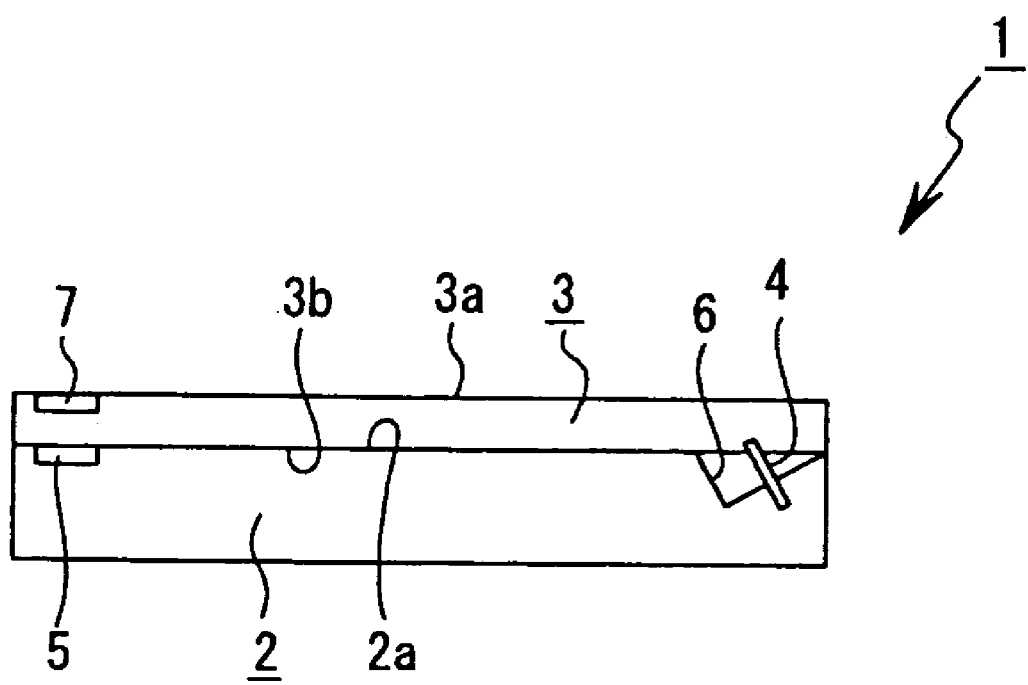
FIG. 2 is a side view illustrating the close state to show the concept of the portable terminal device.

When communication is not performed with the portable wireless telephone set 1, one surface 2a of the first housing 2 is covered with the second housing 3, and the portable wireless telephone set 1 is in a close state (see FIG. 2). In the close state, in the second housing 3, the other surface 3b that is the opposite surface to one surface 3a contacts with or is closing to one surface 2a of the first housing 2.

When communication is performed with the portable wireless telephone set 1, the first housing 2 or the second housing 3 is turned to the second housing 3 or the first housing 2 to the shaftwise direction of the hinge shaft 4, and the portable wireless telephone set 1 is opened (see FIG. 1). The second housing 3 is designed to be tiltable to the hinge shaft 4, so that in the open state, one end part of the second housing 3 is located on the locating concave part 6 of the first housing 2: the second housing 3 is tilted to the first housing 2.

Therefore, in the open state, a first connection line L1 connecting the microphone part 5 of the first housing 2 with the hinge shaft 4 will be set to a predetermined angle θ less than 180° to a second connection line L2 connecting the speaker part 7 of the second housing 3 with the hinge shaft 4 (see FIG. 1).

In this manner, in the open state, by tilting the second housing 3 to the first housing 2 at the specified angle, the portable wireless telephone set 1 becomes the shape along the outline of the caller's face when the caller performs communication, and it can get the microphone part 5 close to the caller's mouth and can get the speaker part 7 close to the caller's ear: the usability in communication can be improved.

Moreover, it is unnecessary that the part having the microphone part 5 in the first housing 2 or the part having the speaker part 7 in the second housing 3 is projected, and in the close state, one surface 2a of the first housing 2 contacts with or is closing to the other surface 3b of the second housing 3: the miniaturization of the portable wireless telephone set 1 can be achieved.

Next, each suitable embodiment according to the present invention will be described.

A first embodiment will be described (see FIGS. 3 to 24).

A portable wireless telephone set 10 is formed by that in the state where one end part of a first housing 11 and one end part of a second housing 12 are overlapped in the shaft direction of a hinge shaft 13, the first housing 11 and the second housing 12 are mutually turnably connected via the said hinge shaft 13 (see FIGS. 3 to 7).

At one end part of one surface 11a, a shallow concave part 15 in an almost spherical form is formed, and at the other end part on one surface 11a of the first housing 11, a microphone part 14 is provided. On one surface 11a of the first housing 11, operation keys 16s are regularly arranged, and a main operating part 17 is formed by the said operation keys 16s.

On one surface 11a of the first housing 11, projections 18s are provided at mutually separated positions.

One end part of the first housing 11 is formed as a slope 11c so that as a position gets apart from the microphone part 14, one surface 11a gets apart from the other surface 11b being the opposite surface to one surface 1a (see FIGS. 6 to 9). The said concave part 15 is formed on the slope 11c.

Figure 9:
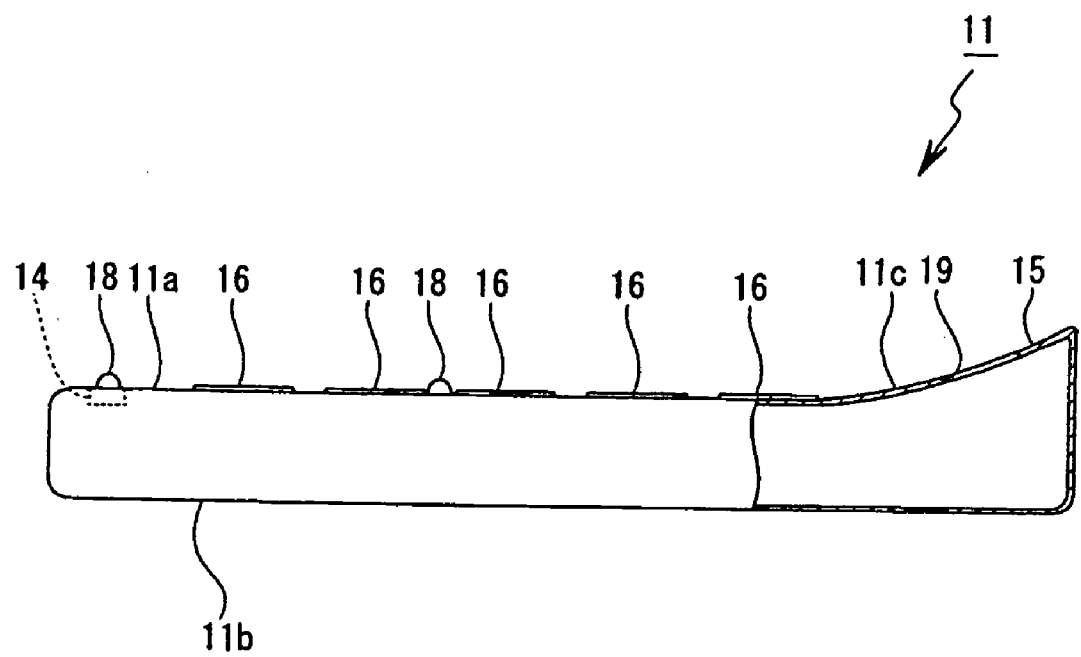
FIG. 9 is an enlarged side view of the first housing, of which a part is shown in section.

On the slope 11c of the first housing 11, a supporting hole 19 is formed (see FIG. 9).

On the other end part on one surface 12a of the second housing 12, a speaker part 20 is provided (see FIGS. 3 to 7, and 11). At one end part of one surface 12a of the second housing 12, keys 21s are arranged, and a suboperating part 22 is formed by the said keys 21s. On one surface 12a of the second housing 12, a display part 23 being a liquid crystal display is provided between the speaker part 20 and the suboperating part 22.

At one end part of the other surface 12b being the opposite surface to one surface 12a of the second housing 12, a projecting part 24 in an almost peripheral form and slightly projected is provided.

One end part of the second housing 12 is formed as a slope 12c so that as a position gets apart from the speaker part 20, the other surface 12b gets close to one surface 12a, and is formed in a tapered wedge form.

Figure 11:
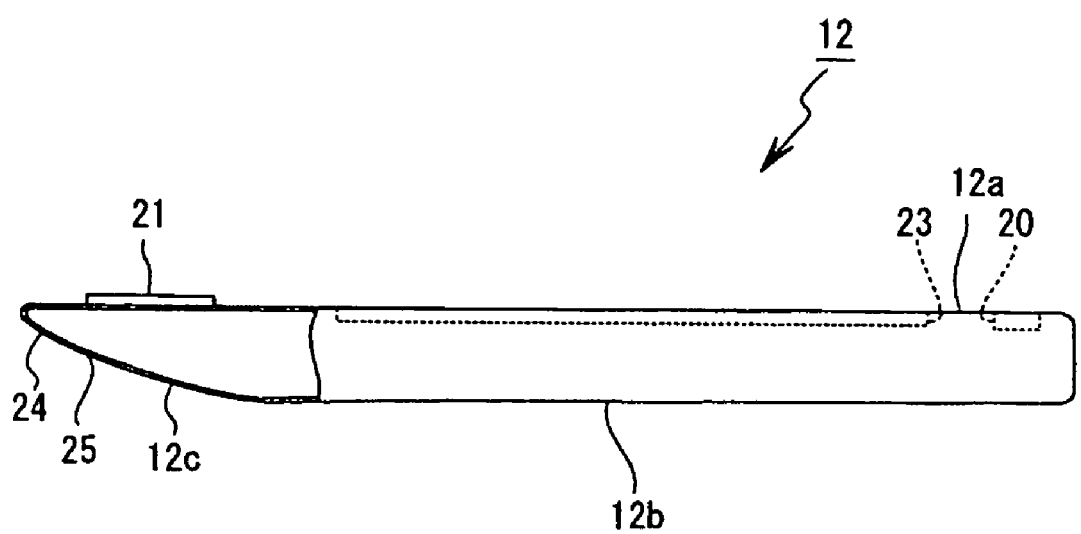
FIG. 11 is an enlarged side view of the second housing, of which a part is shown in section.

On the slope 12c of the second housing 12, a supporting hole 25 is formed (see FIG. 11).

Figure 8:
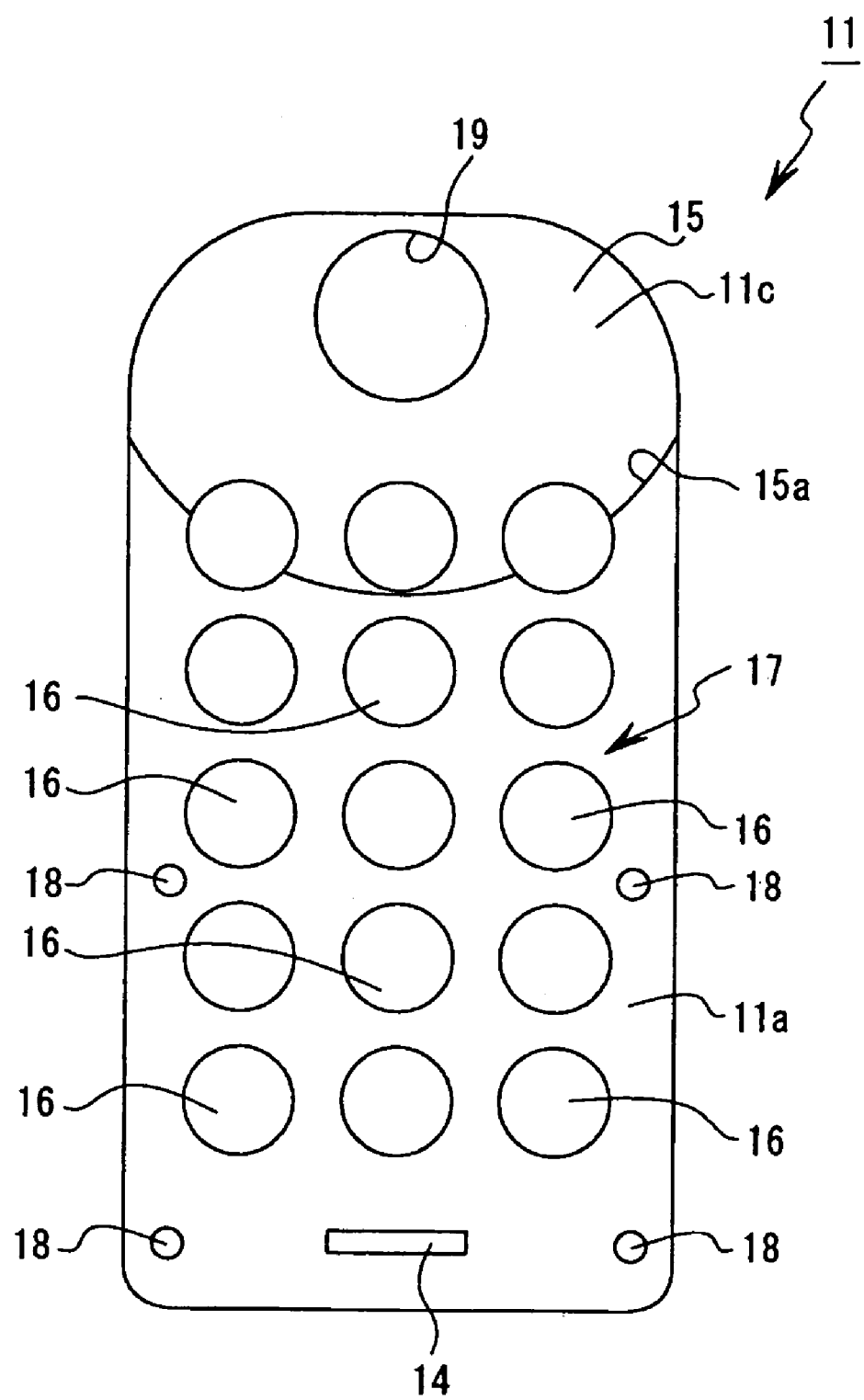
FIG. 8 is an enlarged plane view of the first housing.
Figure 10:
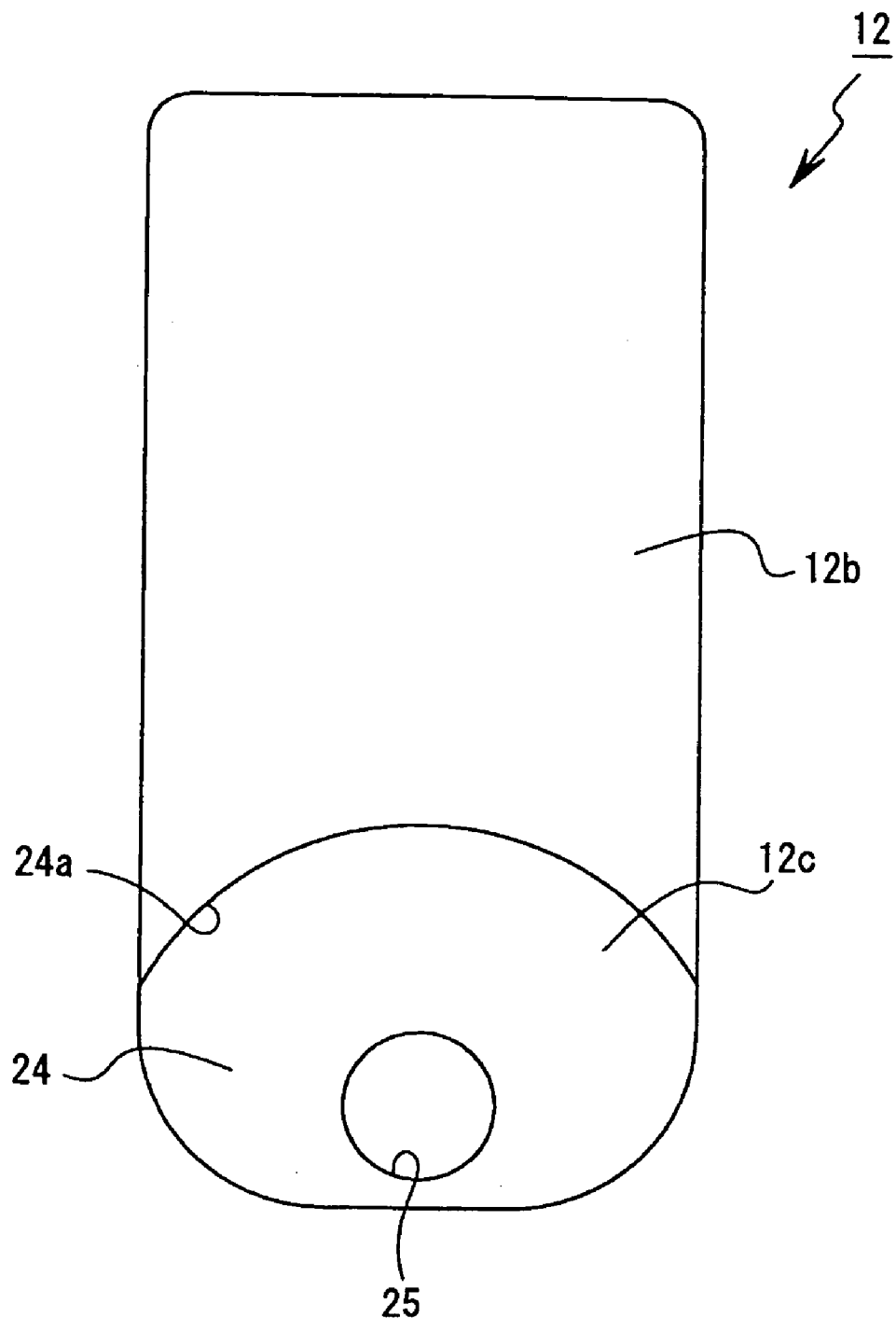
FIG. 10 is an enlarged bottom view of the second housing.

One end part of the first housing 11 and one end part of the second housing 12 are formed in almost hemispherical shapes, respectively (see FIGS. 8 and 10).

Figure 7:
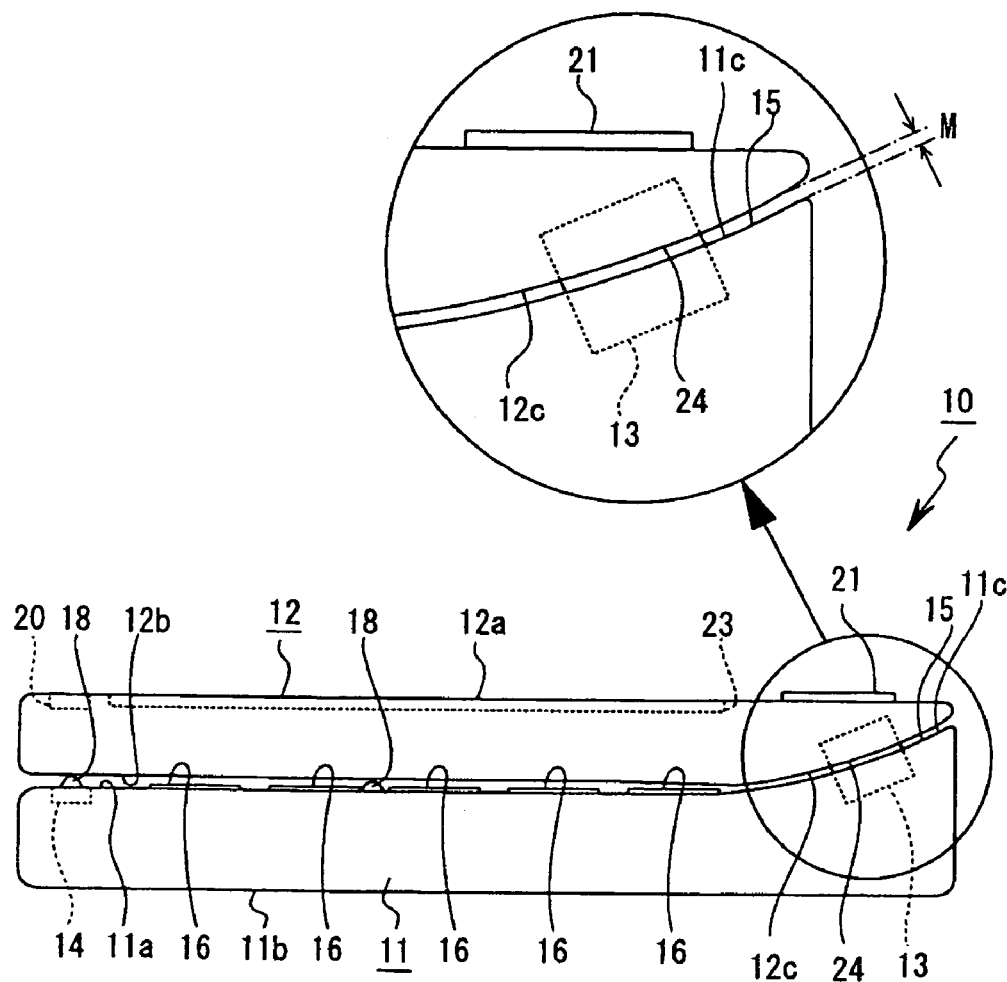
FIG. 7 is an enlarged side view of the portable wireless telephone set in the close state.

The first housing 11 and the second housing 12 are connected via the hinge shaft 13 in the state where one end part of the said second housing 12 is overlapped with one end part of the first housing 11, and the slope 11c of the first housing 11 and the slope 12c of the second housing 12 are close; for instance, about 1 [mm] of a gap M is formed (see FIG. 7). Accordingly, the second housing 12 is turned to the first housing 11 in the state where the projecting part 24 provided on the second housing 12 is close to the concave part 15 formed on the first housing 11.

Figure 6:
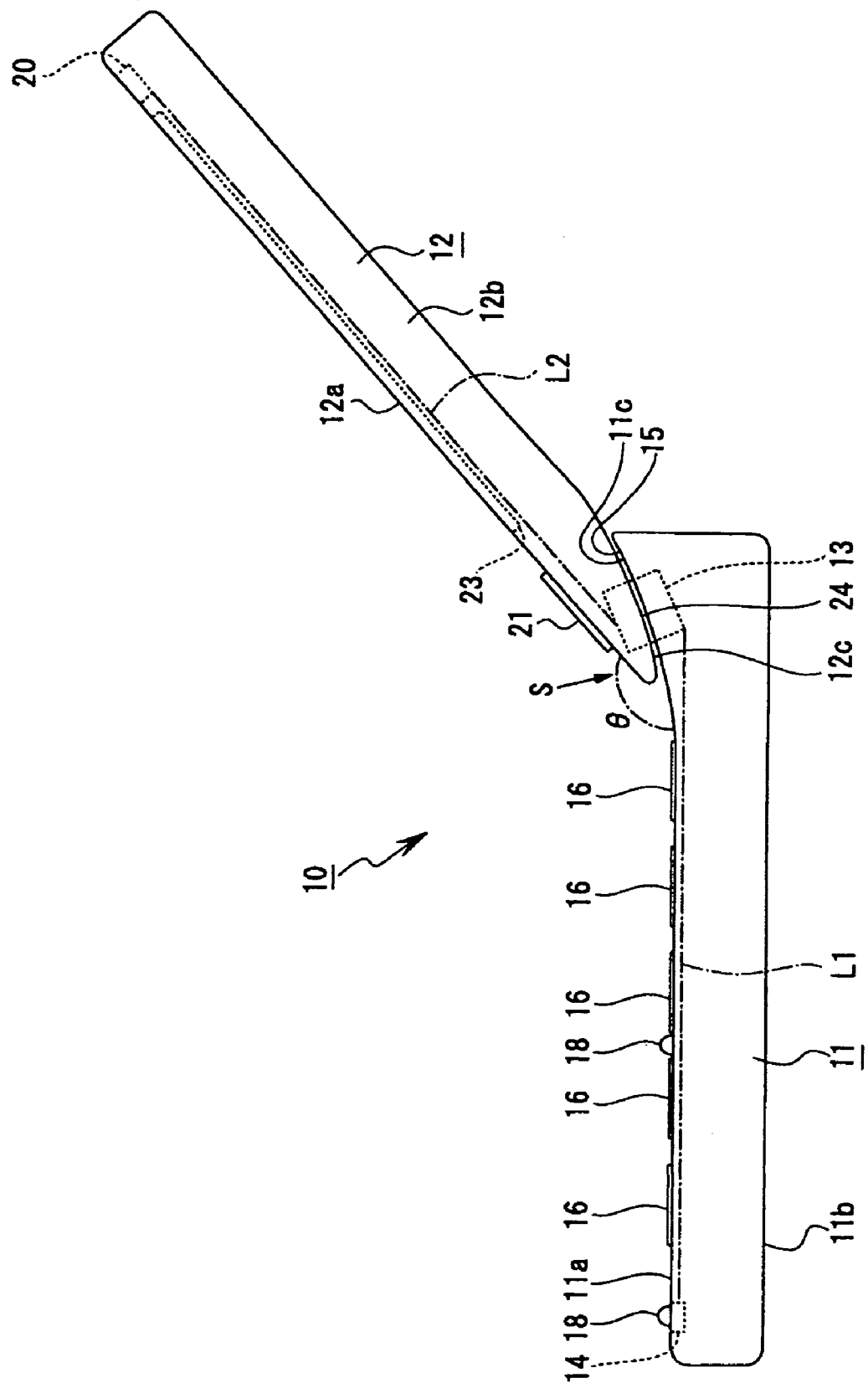
FIG. 6 is an enlarged side view of the portable wireless telephone set in the open state.

The hinge shaft 13 is placed so as to extend to the almost vertical direction to the slope 11c on the first housing 11 and the slope 12c on the second housing 12 (see FIGS. 6 and 7).

Figure 5:
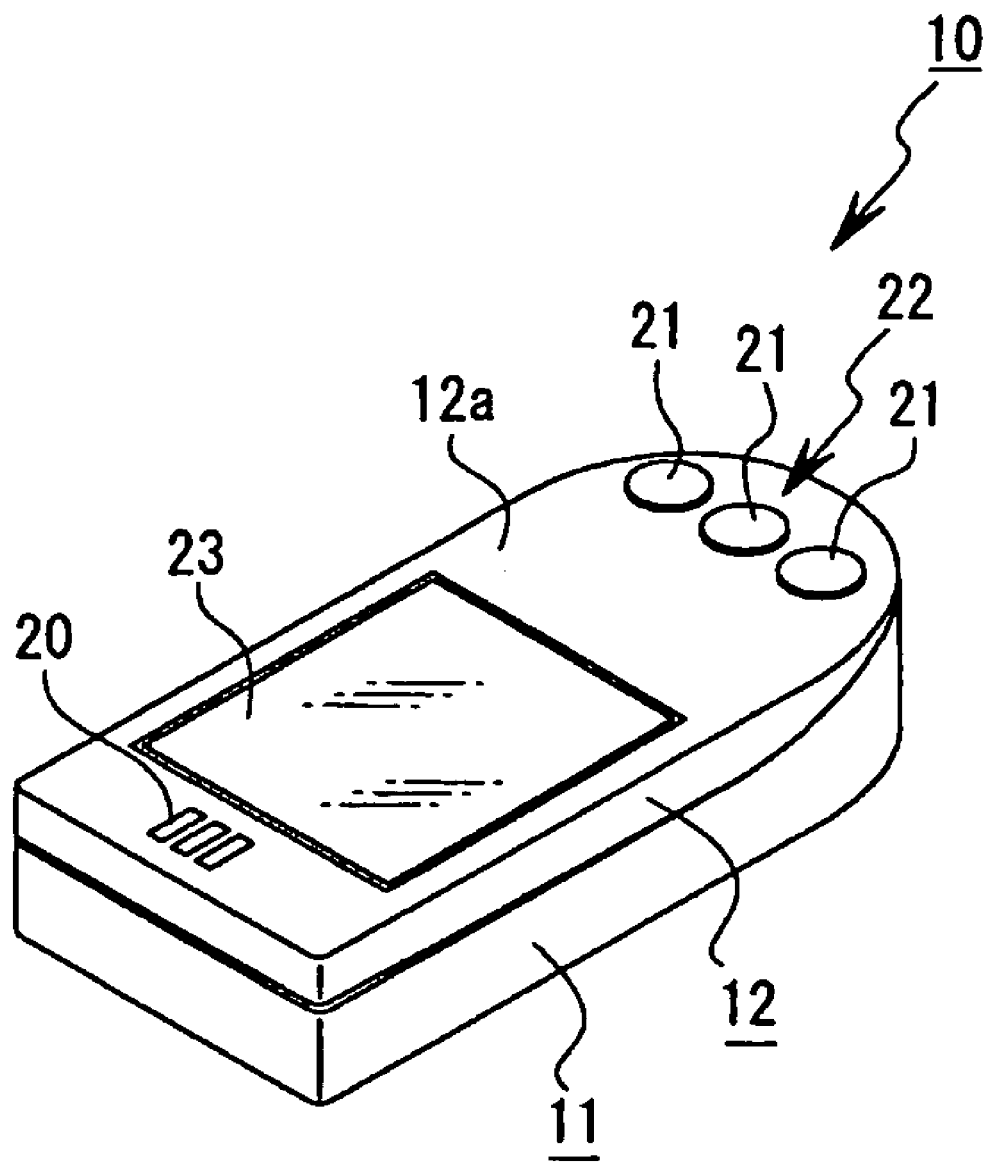
FIG. 5 is a perspective view of the portable wireless telephone set in a close state.

When communication is not performed with the portable wireless telephone set 10, one surface 11a of the first housing 11 is covered with the second housing 12, and they are closed (see FIGS. 5 and 7). In the close state, in the second housing 12, the other surface 12b is placed on the projections 18s provided on the first housing 11, and the other surface 12b is slightly separate from one surface 11a (see FIG. 7). Therefore, even if force toward the first housing 11 is applied to the second housing 12, the operation keys 16s arranged on the first housing 11 are not depressed by the first second housing 12: the operation of the operation keys 16s not intended by the user can be prevented.

In the said close state, the predetermined operation of the keys 21s arranged on the second housing 12 can be performed while confirming a display on the display part 23.

Figure 3:
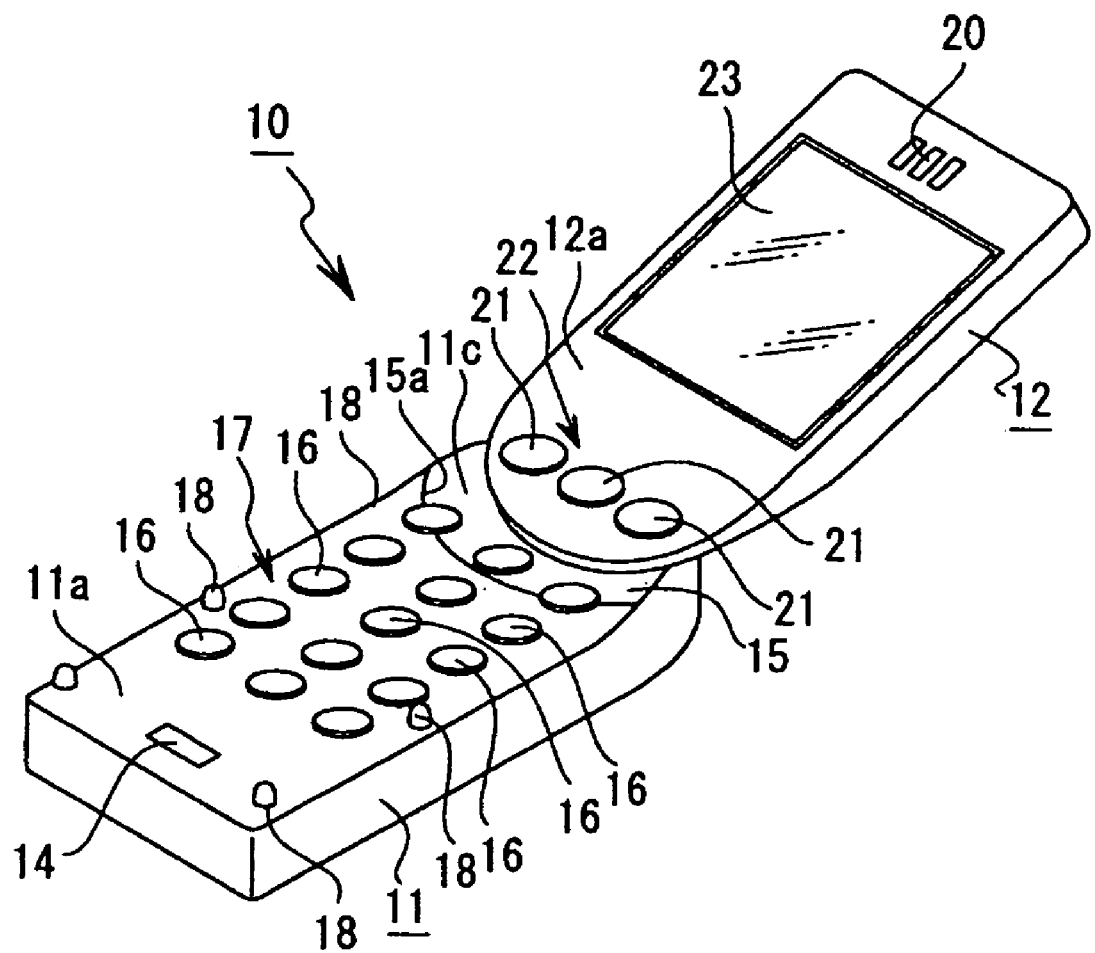
FIG. 3 is a diagram to show a first embodiment of a portable terminal device according to the present invention with FIGS. 4 to 24, and is a perspective view of a portable wireless telephone set in an open state.
Figure 4:
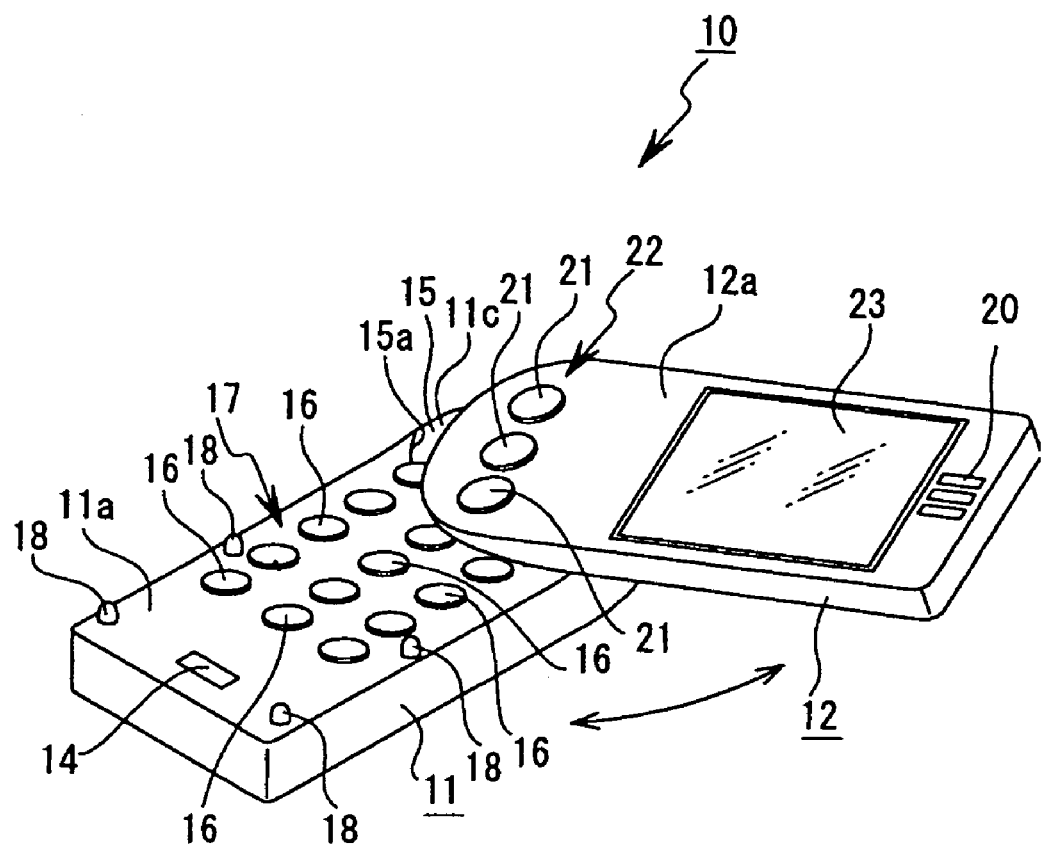
FIG. 4 is a perspective view of the portable wireless telephone set in the state where a second housing is being turned.

When communication is performed with the portable wireless telephone set 10, the first housing 11 or the second housing 12 is turned to the shaftwise direction of the hinge shaft 13 to the second housing 12 or the first housing 11 (see FIG. 4), and the portable wireless telephone set 10 is opened (see FIGS. 3 and 6).

Since the slope 11c of the first housing 11 and the slope 12c of the second housing 12 are close as described above, in the open state, the second housing 12 is tilted to the first housing 11 at a predetermined angle, and a first connection line L1 connecting the microphone part 14 of the first housing 11 with the hinge shaft 13 is set to a predetermined angle less than 180° to a second connection line L2 connecting the speaker part 20 of the second housing 12 with the hinge shaft 13 (see FIG. 6). As the angle θ formed by the first housing 11 and the second housing 12, 135° to 170° is desirable from the consideration of the shape along the outline of the caller's face when the caller performs communication.

Note that, also in the aforementioned state, the predetermined operations of the keys 21s arranged on the second housing 12 can be performed.

Figure 12:
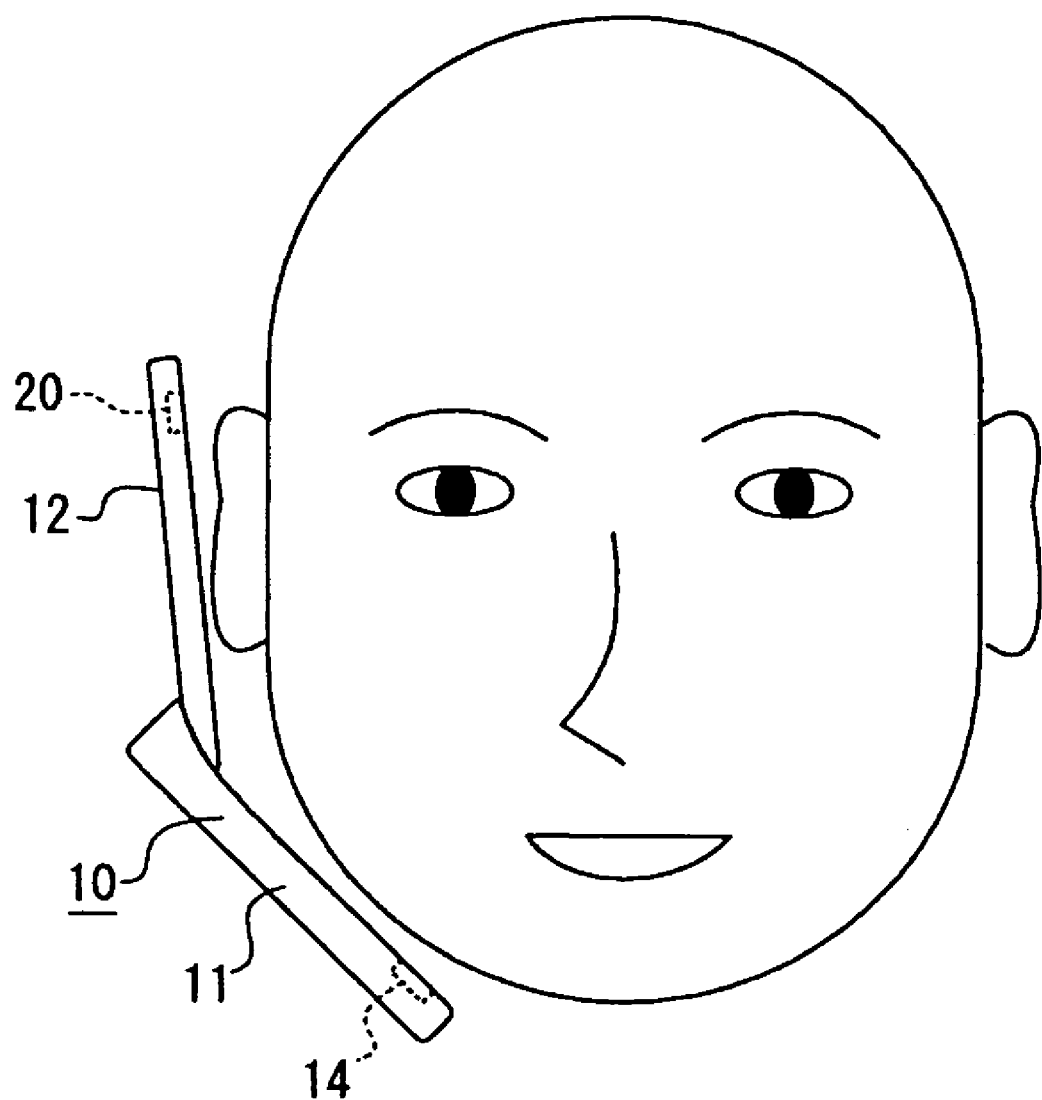
FIG. 12 is an illustration showing the state where the portable wireless telephone set is being used.
Figure 13:
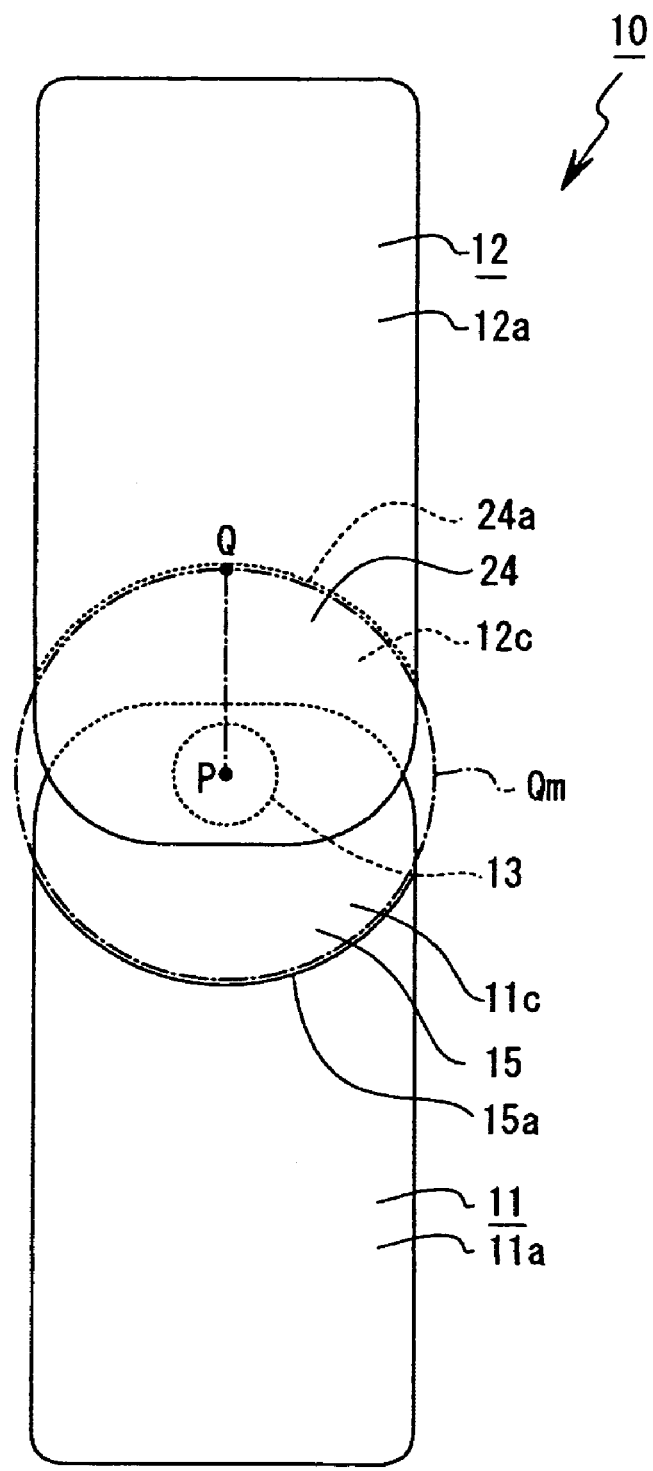
FIG. 13 is a conceptual view showing the relations between the concave part of the first housing and the projecting part of the second housing.
Figure 14:
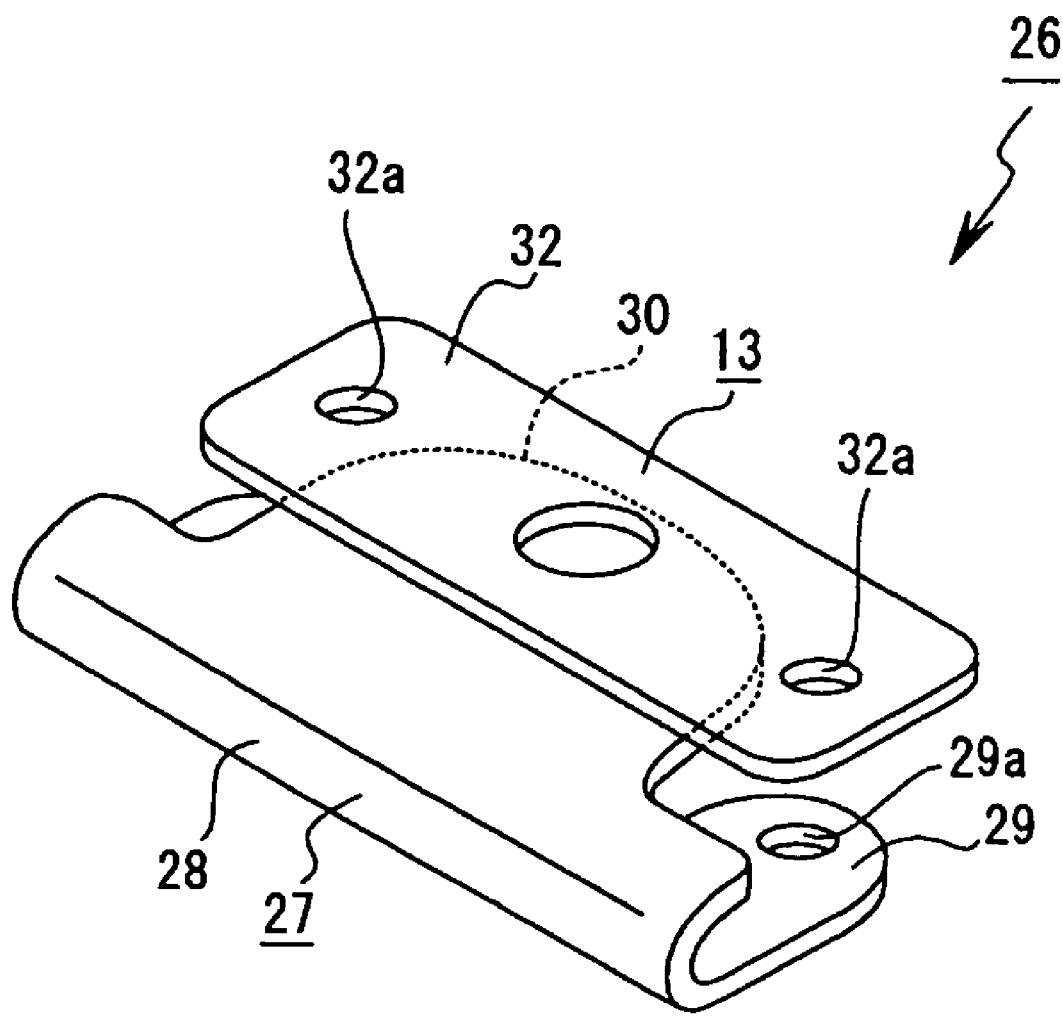
FIG. 14 is a diagram to show a turning supporting mechanism with FIGS. 15 to 18, and is an enlarged perspective view.
Figure 15:
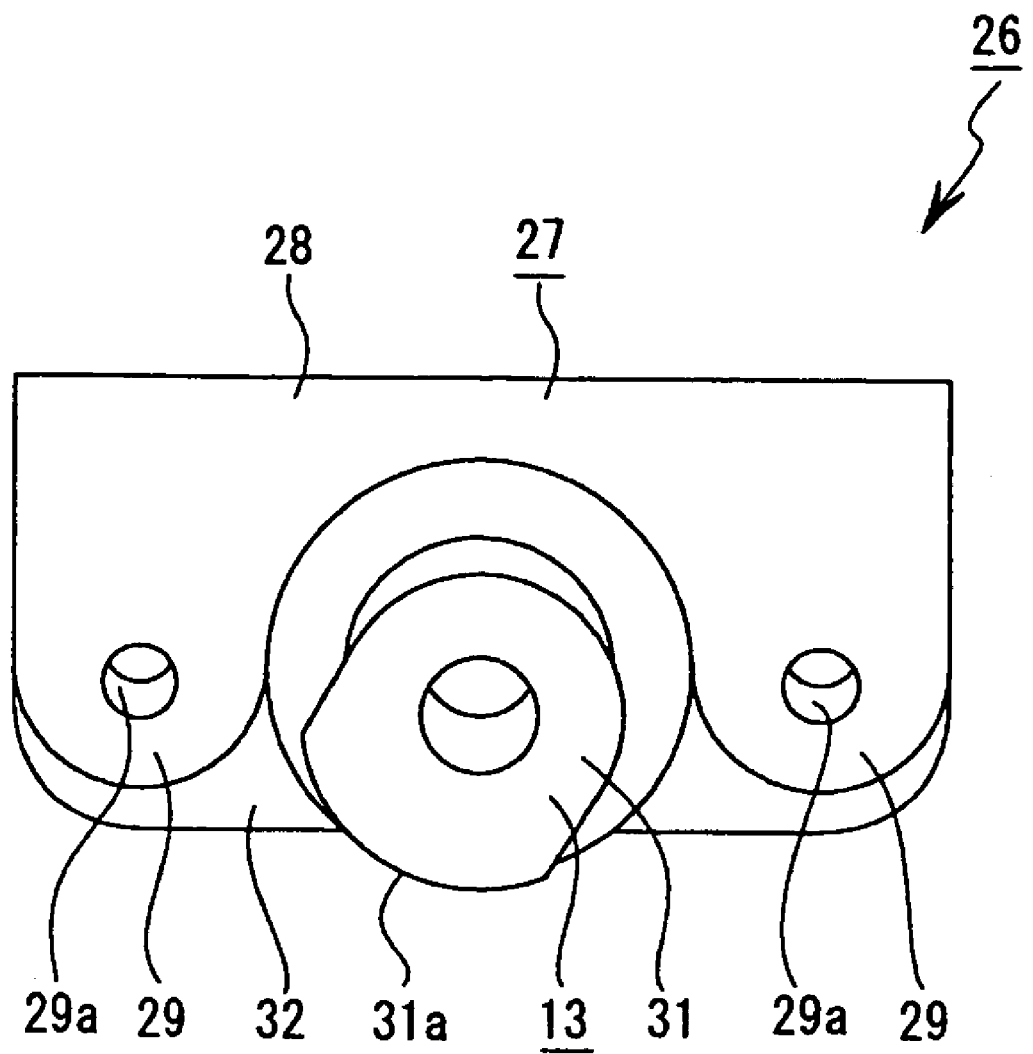
FIG. 15 is an enlarged bottom view.

In the open state, by tilting the second housing 12 to the first housing 11 at the predetermined angle θ as the above, the portable wireless telephone set 10 becomes the shape along the outline of the caller's face when the caller performs communication, and it can get the microphone part 14 close to the caller's mouth and can get the speaker part 20 to the caller's ear: the usability in communication can be improved (see FIG. 12).

Moreover, it is unnecessary that the part having the microphone part 14 in the first housing 11 or the part having the speaker part 20 in the second housing 12 is projected, and in the close state, one surface 11a of the first housing 11 is closing to the other surface 12b of the second housing 12: the miniaturization of the portable wireless telephone set 10 can be achieved.

Furthermore, in the portable wireless telephone set 10, since the other end part of the second housing 12 is formed in a tapered wedge shape, in the open state, there is no bump between one surface 11a of the first housing 11 and one surface 12a of the second housing 12 (see an arrow S in FIG. 6), so that the keys 21s can be operated in the state where the caller holds the first housing 11, by slipping the finger of the said holding hand from one surface 2a to one surface 3a: the operability can be improved.

When the first housing 11 or the second housing 12 is turned to the second housing 12 or the first housing 11, the second housing 12 is turned to the first housing 11 between the open state where the second housing 12 is tilted to the first housing 11 and the close state where the second housing 12 is horizontally overlapped with the first housing 11. Therefore, the second housing 12 is turned in the state where it is tilted to the first housing 11, thereby, if the moving locus Qm of a point Q where the distance is the maximum in a distance from a turning fulcrum P to the slope 12c of the second housing 12 (see FIG. 13) falls on the horizontal plane of one surface 11a of the first housing 11, the first housing 11 interferes with the second housing 12, and it cannot be turned.

Then, in the portable wireless telephone set 10, the concave part 15 is formed at one end part of the first housing 11, and the projecting part 24 is provided at one end part of the second housing 12, to prevent the interference between the first housing 11 and the second housing 12 in turning. By the prevention of the interference between the first housing 11 and the second housing 12, smooth turning operation between both can be maintained.

Furthermore, to avoid the interference between the first housing 11 and the second housing 12, in the close state, it is unnecessary to place the first housing 11 and the second housing 12 in the state where one surface 11a and the other surface 12b are widely separate: it can get the portable wireless telephone set 10 thinner.

Note that, it has shown the example that the concave part 15 is formed in the first housing 11 and the projecting part 24 is provided in the second housing 12 in the above, however, conversely, also it is possible to provide a projection part in the first housing 11 and form a concave part in the second housing 12 so as to prevent the interference between the first housing 11 and the second housing 12 in turning.

Furthermore, it has shown the example that the projections 18s are provided in the first housing 11 in the above, however, if it is designed so that the surfaces of the operation keys 16s being the main operating part 17 are placed on the same plane as one surface 11a when the operation keys 16s are not operated, the projections 18s especially may not be provided. In this case, a gap between one surface 11a of the first housing 11 and the other surface 12b of the second housing 12 in the close state can be omitted: the portable wireless telephone set 10 can be further miniaturized and can be got thinner.

Next, a turning supporting mechanism 26 having the said hinge shaft 13 will be described (see FIGS. 14 to 18).

The turning supporting mechanism 26 is composed of a tilt angle changing member 27 to be fitted to the first housing 11, and the hinge shaft 13 to be fitted to the second housing 12 and freely turnably supported by the tilt angle changing member 27.

The tilt angle changing member 27 is formed by machining a springy planar metallic material, and a base part 28, fitting pieces 29s and a supporting piece 30 are formed in one body. The base part 28 is bent at the almost same angle as the said tilt angle θ formed by the first housing 11 and the second housing 12; the fitting pieces 29s are projected from the positions separate from the edges of one end of the base part 28 in the width direction; and the supporting piece 30 is projected to the same side as the fitted pieces 29s from the center part of the edges of the other end of the base part 28 in the width direction. In the fitting pieces 29s, a screw inserting-hole "29a" is formed, respectively. In the supporting piece 30, a shaft inserting hole not shown is formed.

The hinge shaft 13 is composed of a shaft part 31 and a planar fitting piece 32 provided at one end part of the said shaft part 31. At the other end part of the shaft part 31, a coming-out preventing projecting part 31a projected from its outer circumference side is provided. In the fitting piece 32, screw inserting holes "32a"s are formed at the both end parts.

The hinge shaft 13 is freely turnably supported to the tilt angle changing member 27 by that the shaft part 31 is inserted into the shaft inserting hole of the supporting piece 30 of the tilt angle changing member 27.

The fitting pieces 29s of the tilt angle changing member 27 are fitted on the first housing 11. The fitting pieces 29s are fitted on the first housing 11 by inserting fitting screws not shown into the screw inserting holes "29a"s and screwing them on the first housing 11.

Figure 16:
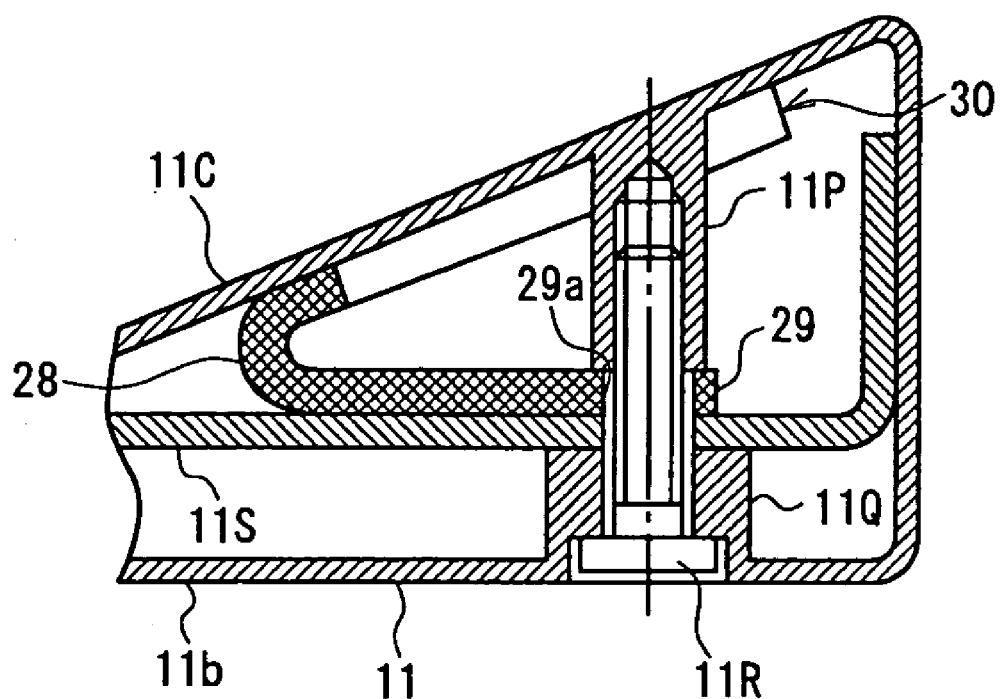
FIG. 16 is a schematic sectional view showing the fitted state of the turning supporting mechanism.
Figure 17:
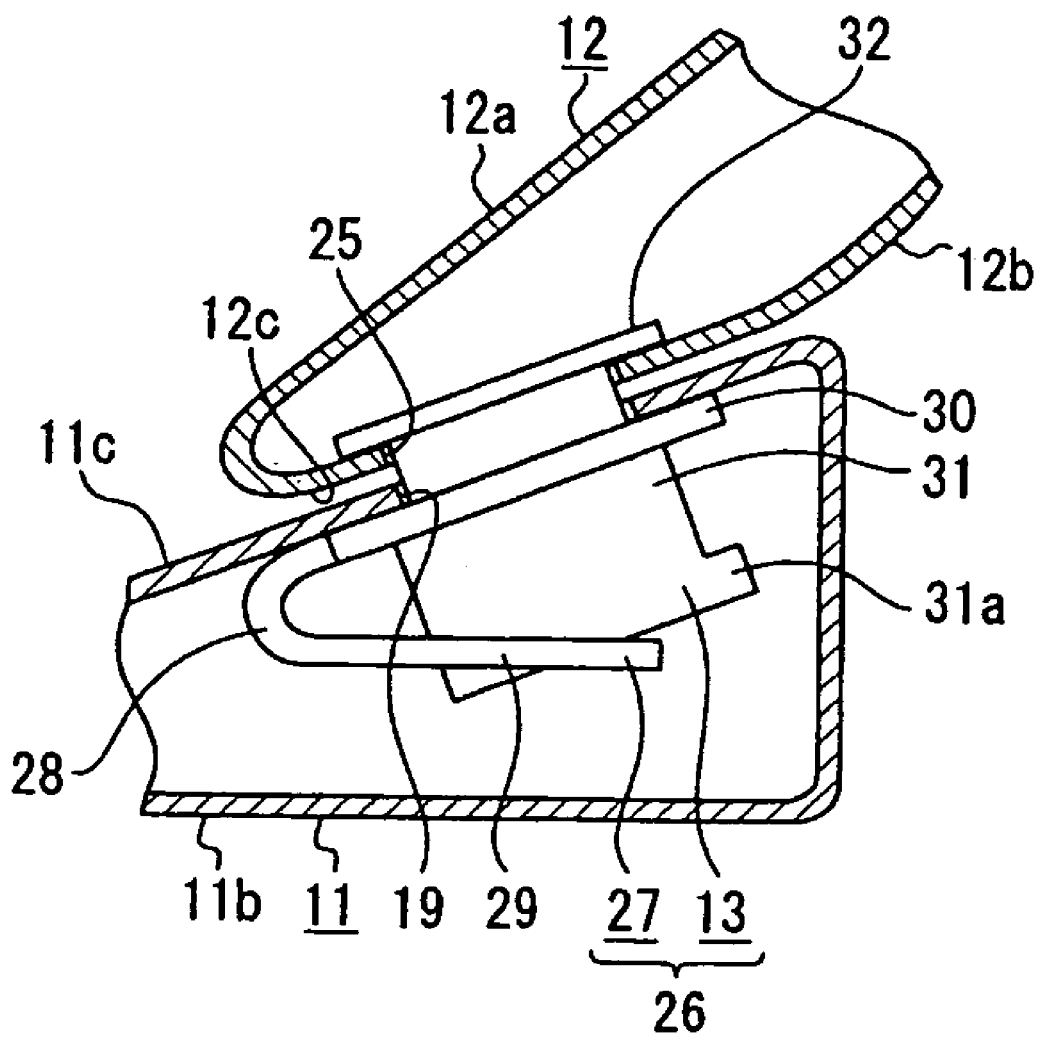
FIG. 17 is an enlarged side view showing the state where the first housing and the second housing are connected.
Figure 18:
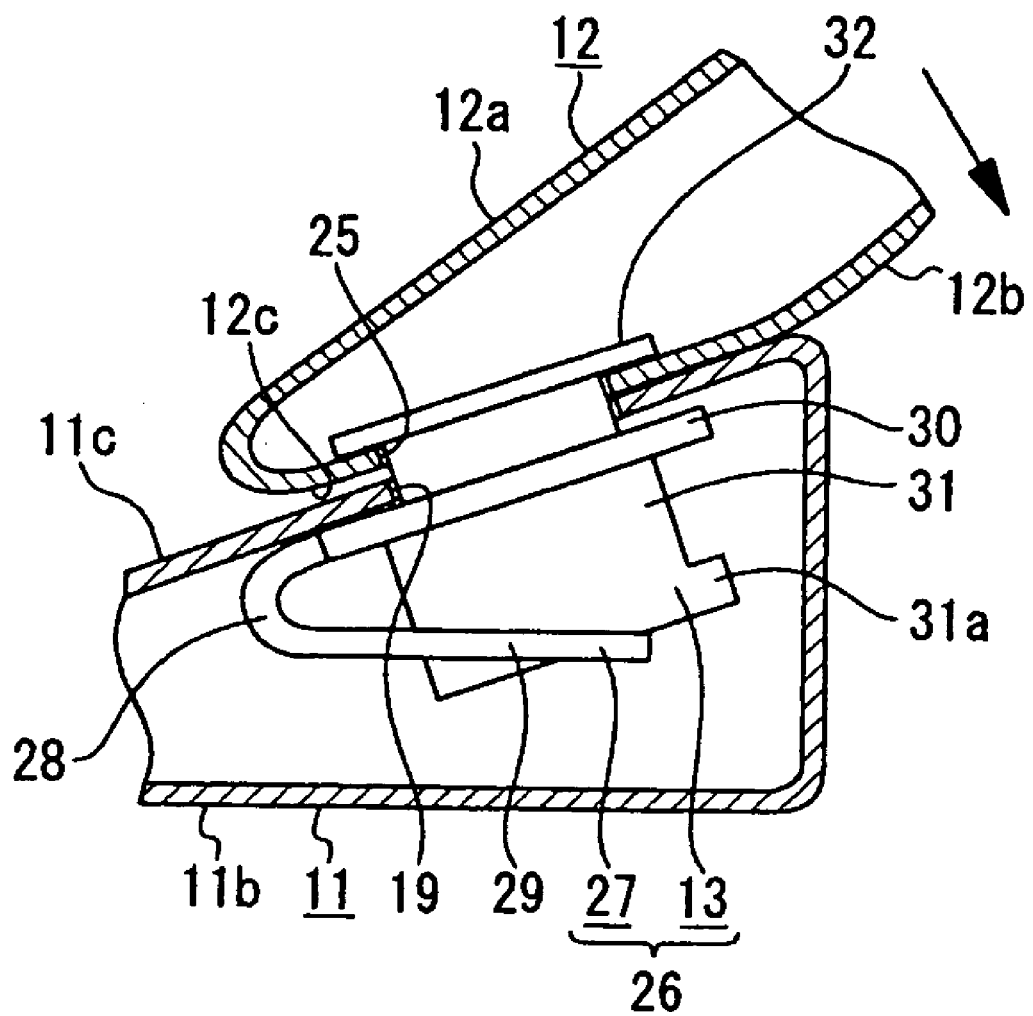
FIG. 18 is an enlarged side view showing the state where force is being given.

To put it concretely, as shown in FIG. 16, in the first housing 11, a first boss 11P is provided on the opposite inner circumference side to the slope 11c in the state where a female screw is formed in its inside, and also a second boss 11Q having the same central axis as the central axis of the said first boss 11P is provided on the inner circumference side of the other surface 11b.

In the state where a metallic plate 11S previously fitted on the first housing 11 is inserted between these first boss 11P and second boss 11Q, a fitting screw 11R is inserted into the inserting hole of the said second boss 11Q, the through hole of the plate 11S and the screw inserting holes "29a"s of the fitted pieces 29s: the fitting pieces 29s of the tilt angle changing member 27 are screwed to the first boss 11P by the said fitting screw 11R.

Thereby, in the tilt angle changing member 27 of the turning supporting mechanism 26, the fitting pieces 29s are fixed to the first housing 11 in one body by that the said fitting pieces 29s are screwed and fixed to the first housing 11 via the plate 11S, and on the other hand, the supporting piece 30 becomes the state where it only abuts on the opposite surface of the first housing 11 to the slope 11c.

Note that, by fitting the fitting pieces 29s of the tilt angle changing member 27 into the first housing 11 via the metallic plate 11S, the intensity of the first housing 11 can be increased, and even if some load is charged on the said first housing 11 from the outside, breakage can be prevented.

The fitting piece 32 of the hinge shaft 13 is fitted into the second housing 12. The fitting piece 32 is fitted on the second housing 12 by inserting fitting screws not shown into screw inserting holes "32a"s and screwing the fitting piece 32 onto the second housing 12.

In this manner, by fitting the tilt angle changing member 27 into the first housing 11, the hinge shaft 13, and the second housing 12, the first housing 11 and the second housing 12 are turnably connected (see FIG. 17): the portable wireless telephone set 10 is formed.

In the state where the first housing 11 and the second housing 12 are connected, there is a case where force is applied to one or both of the first housing 11 and second housing 12. At this time, the tilt angle changing member 27 elastically changes the shape (see FIG. 18). Accordingly, when force is applied to one or both of the first housing 11 and the second housing 12, the breakage of the first housing 11 and the second housing 12 can be prevented, and a separation between the first housing 11 and the second housing 12 can be prevented.

That is, if force shown by an arrow (FIG. 18) is applied to the first housing 11, since the fitting pieces 29s of the tilt angle changing member 27 are fixed to the first housing 11, the supporting piece 30 of the tilt angle changing member 27 elastically changes the shape in the same direction as the direction that force is being applied: a gap generates between the slope 11c of the first housing 11 and the supporting piece 30 of the tilt angle changing member 27.

If the force applied to either or both of the first housing 11 and the second housing 12 is removed, the tilt angle changing member 27 elastically returns to the normal shape, and the first housing 11 and the second housing 12 return to the original tilt angle.

Note that, both of the first housing 11 and the second housing 12 are designed to be elastically changeable the shape within the elasticity of the forming material; they can change the shape about 10° on the basis of the tilt angle θ. Accordingly, the second housing 12 can elastically change the shape to the maximum about 170° to the first housing 11, by adding the said elastic change of the tilt angle changing member 27.

Figure 19:
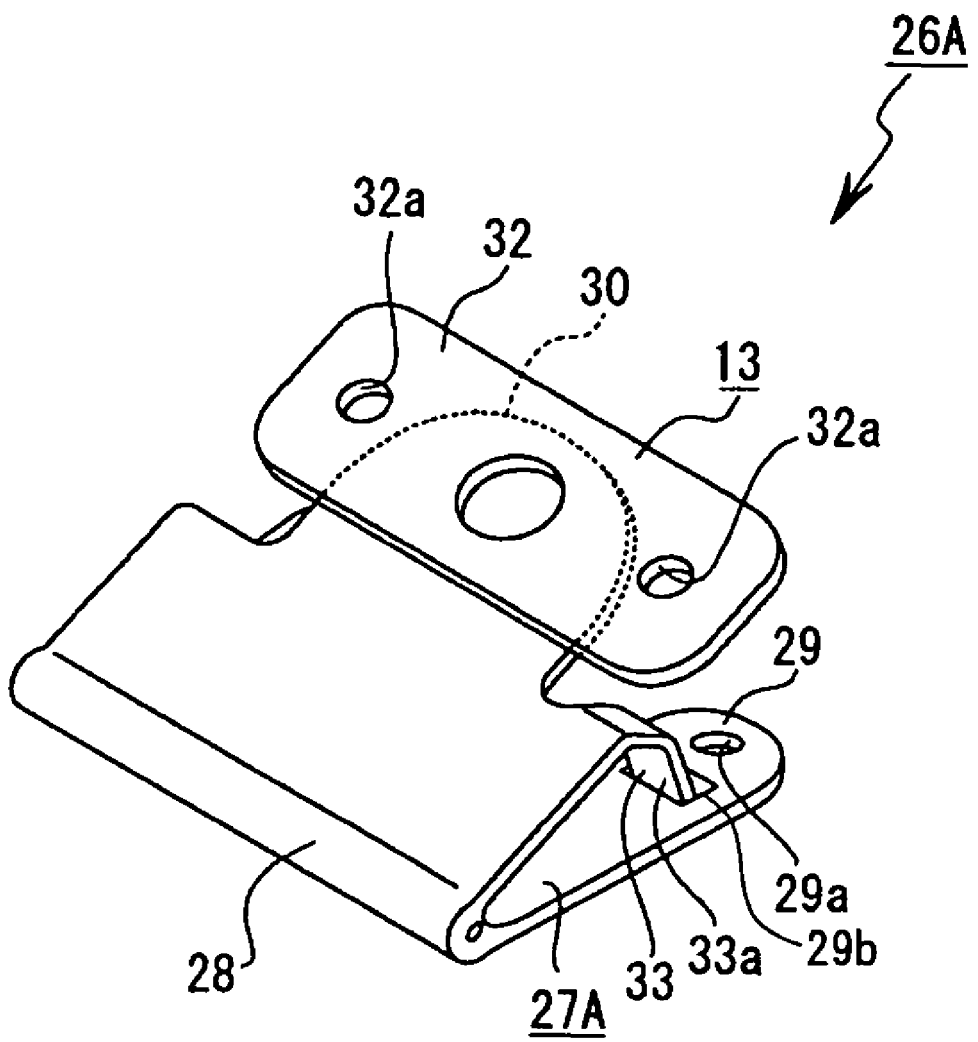
FIG. 19 is a diagram to show a modified example of the turning supporting mechanism with FIGS. 20 and 21, and is an enlarged perspective view.
Figure 20:
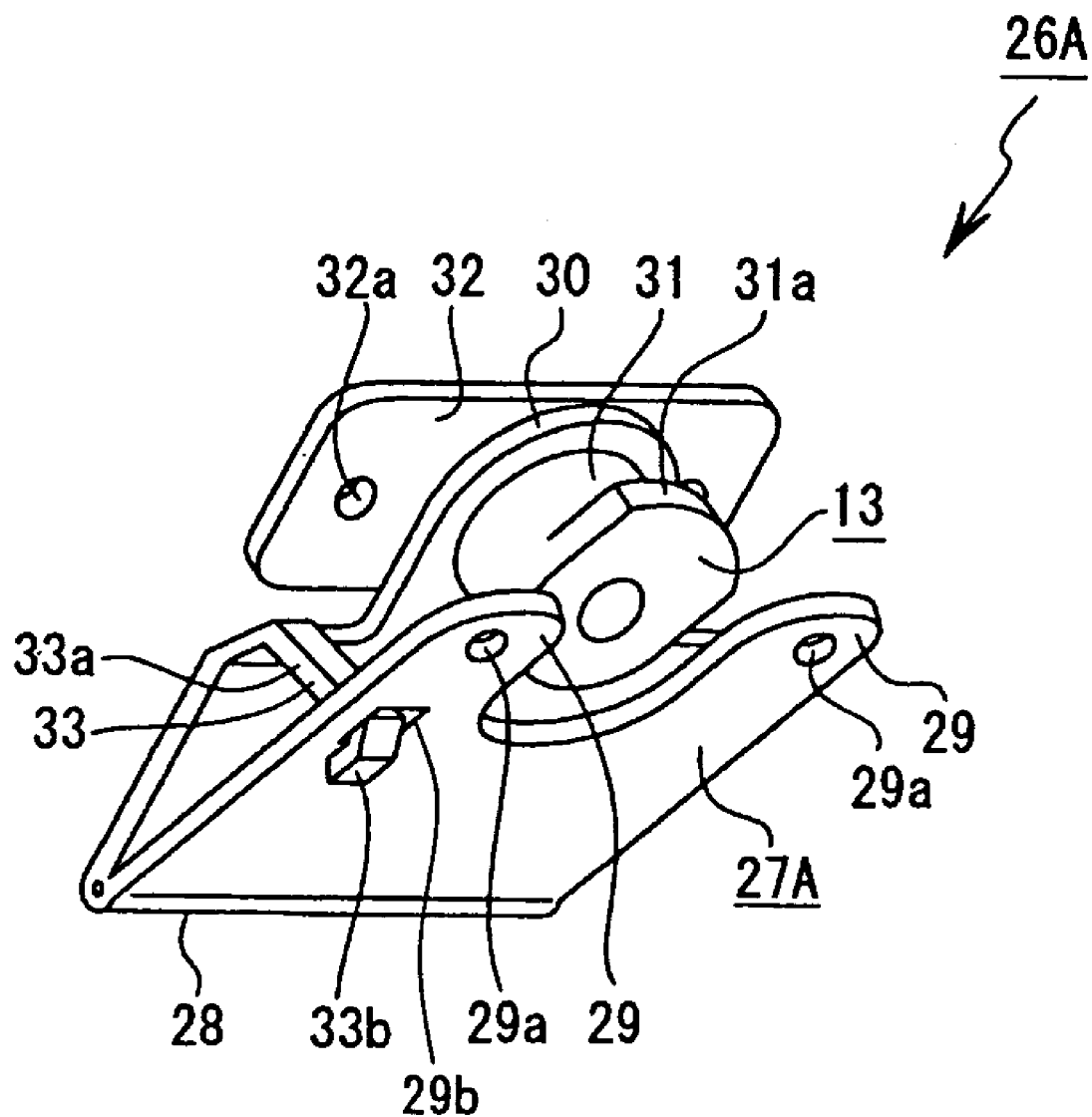
FIG. 20 is an enlarged perspective view from a different angle from FIG. 19.
Figure 21:
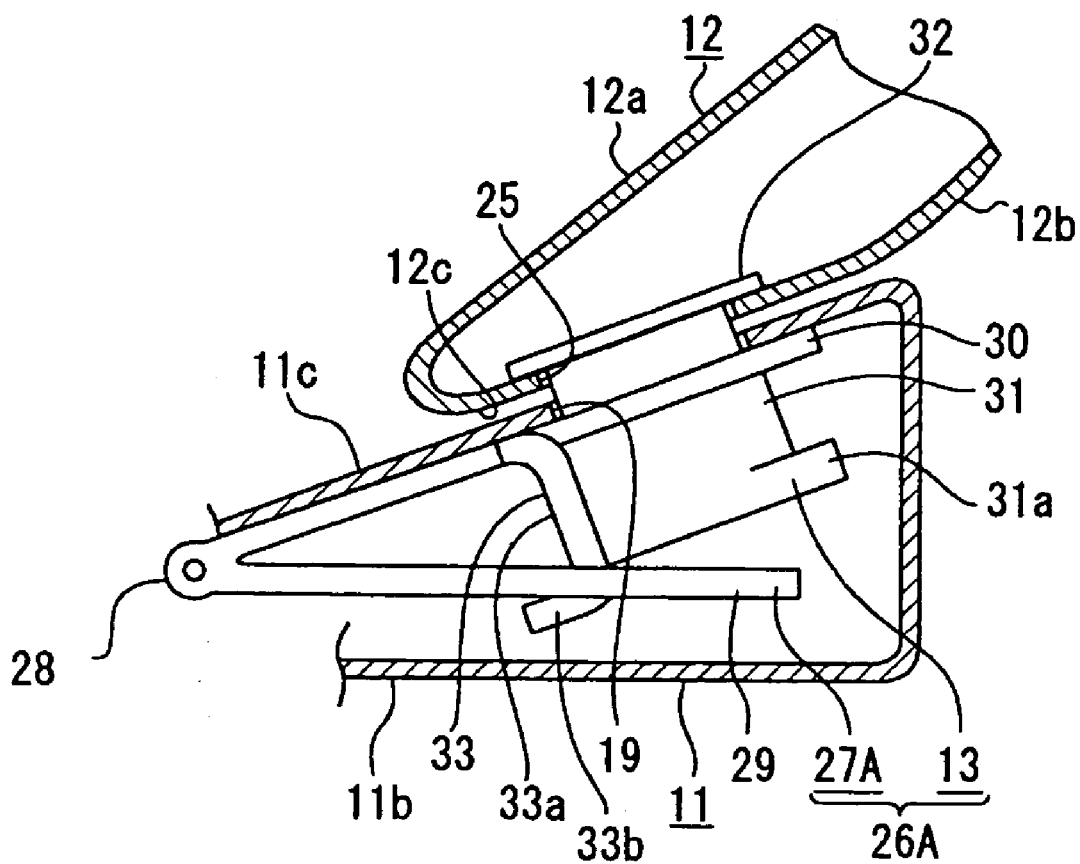
FIG. 21 is an enlarged side view.

Next, a turning supporting mechanism 26A that is a modified example of the turning supporting mechanism 26 will be described (see FIG. 19 and/or 21). Note that, in the turning supporting mechanism 26A described below, because a different point from the said turning supporting mechanism 26 is only that a stopper inserting hole is formed in a stopper projecting piece and a tilt angle changing member, only the different parts from the turning supporting mechanism 26 will be described in detail, and the description of the other part will be omitted by adding the same reference numerals as the reference numerals added to the same part in the turning supporting mechanism 26.

The turning supporting mechanism 26A is composed of a tilt angle changing member 27A to be fitted on the first housing 11, and the hinge shaft 13 to be fitted on the second housing 12 and freely turnably supported by the tilt angle changing member 27A.

At one of the fitting pieces 29s of the tilt angle changing member 27A, a stopper inserting hole 29b is formed. From the base part 28 of the tilt angle changing member 27A, a stopper projecting piece 33 that has been inserted into the stopper inserting hole 29b is projected. The stopper projecting piece 33 is composed of a projecting part 33a and a hook part 33b; it is formed by that the projecting part 33a is projected to an almost orthogonal direction to the base part 28, and the hook part 33b is bent to an almost orthogonal direction to the projecting part 33a.

Also in the case where the turning supporting mechanism 26A is used instead of the turning supporting mechanism 26, similarly to the turning supporting mechanism 26, when force is applied to either or both of the first housing 11 and the second housing 12, the breakage of the first housing 11 and the second housing 12 can be prevented, and a separation between the first housing 11 and the second housing 12 can be prevented.

Furthermore, in the turning supporting mechanism 26A, by hooking the hook part 33b of the stopper projecting piece 33 on the opening edge of the stopper inserting hole 29b of the fitting piece 29, an angle formed by the fitting pieces 29s to be fitted on the first housing 11 and the fitting piece 32 to be fitted on the second housing 12 does not change: in the state where force is not applied to the first housing 11 or the second housing 12, the tilt angle θ formed by the first housing 11 and the second housing 12 can be constantly kept.

Figure 22:
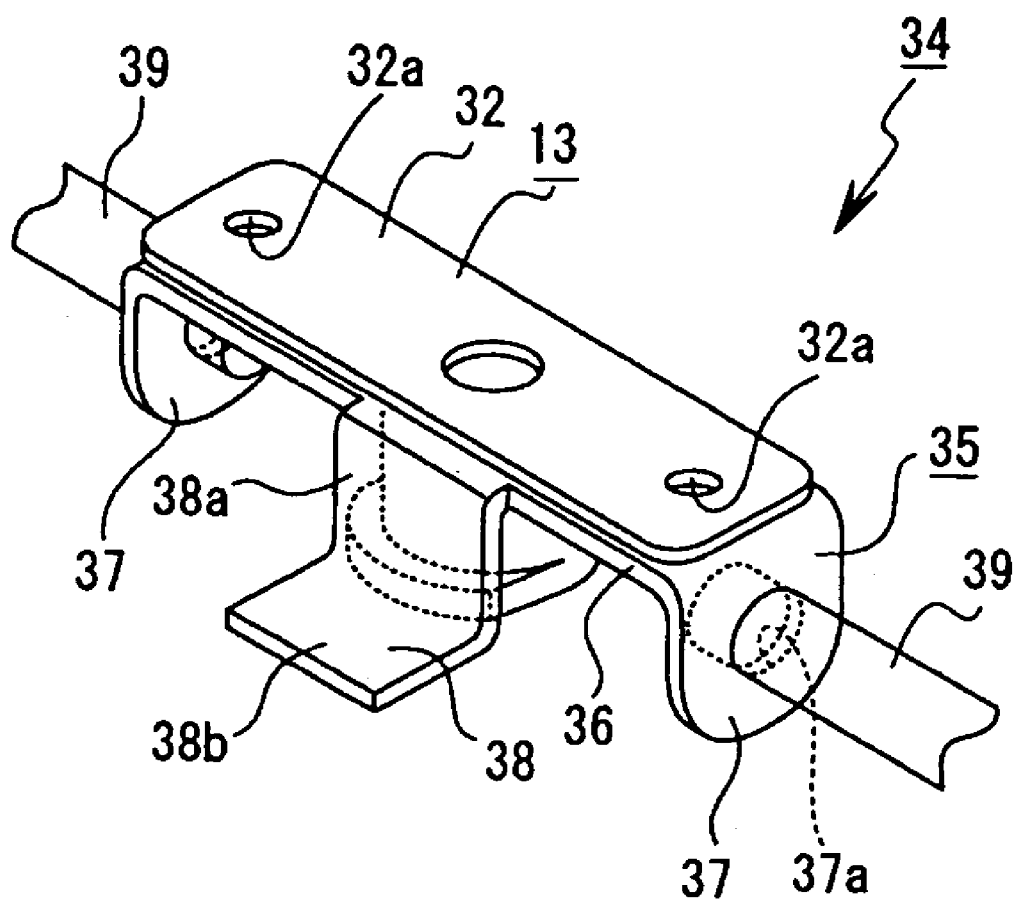
FIG. 22 is a diagram showing another turning supporting mechanism with FIGS. 23 and 24, and is an enlarged perspective view.
Figure 23:
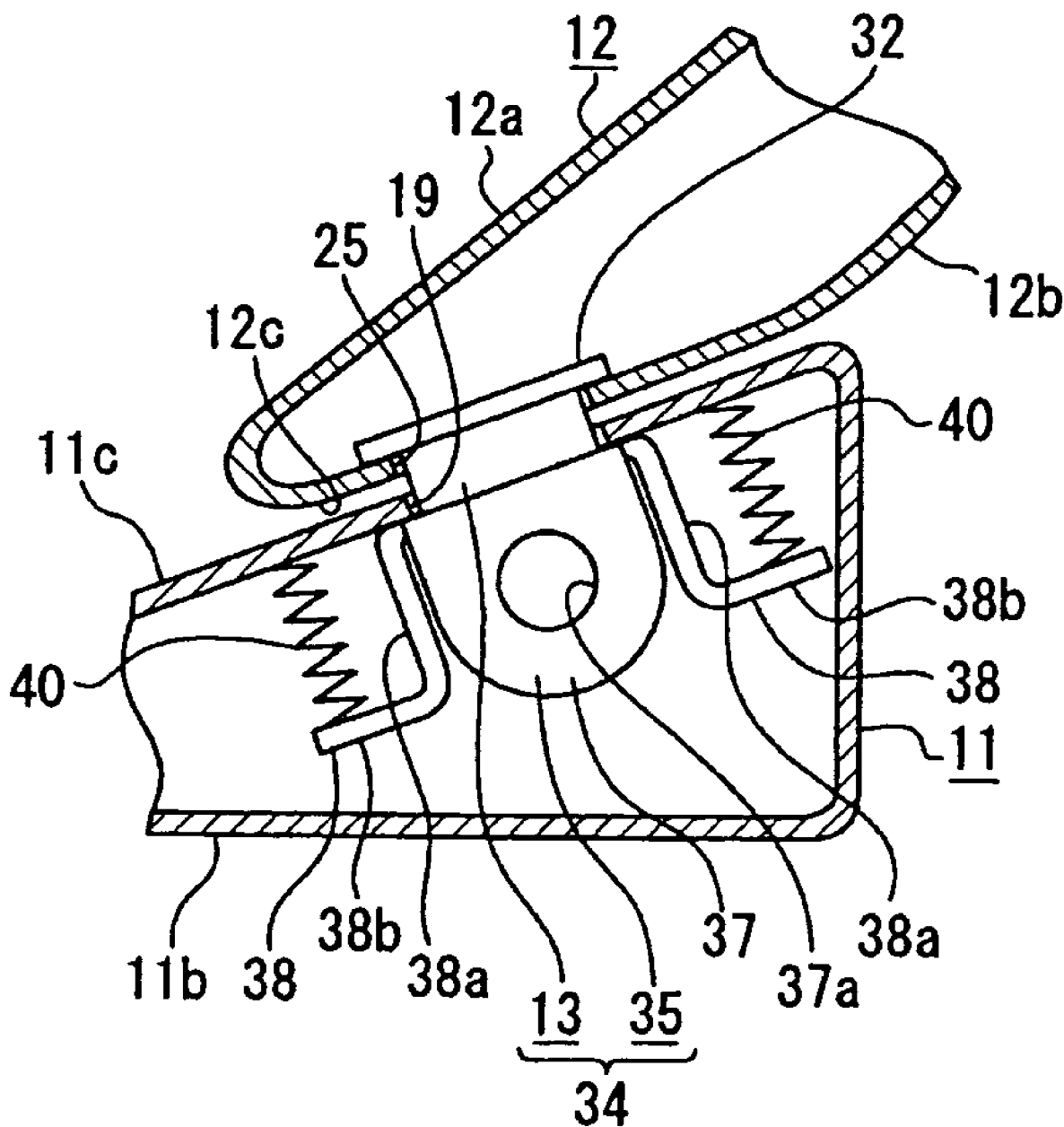
FIG. 23 is an enlarged side view showing the state where the first housing and the second housing are connected.

Next, a turning supporting mechanism 34 having the said hinge shaft 13 will be described (see FIGS. 22 to 24).

The turning supporting mechanism 34 is composed of a tilt angle changing member 35 to be freely turnably supported by the first housing 11, and the hinge shaft 13 to be fitted on the second housing 12 and freely turnably supported by the tilt angle changing member 35.

The tilt angle changing member 35 is formed by machining a planar metallic material, and a base part 36, supporting parts 37s, and spring supporting pieces 38s are formed in one body. The base part 36 has an almost rectangular shape, and a shaft inserting hole not shown is formed at the center part. The supporting parts 37s are provided so as to project to the same orthogonal direction from the both end parts of the base part 36 in the longitudinal direction, and supporting holes "37a"s are formed respectively.

The spring supporting pieces 38s are provided so as to project to the same direction from the both edges of the center part of the base part 36 in the longitudinal direction, respectively. The spring supporting pieces 38s are composed of projecting piece parts "38a"s which project to the orthogonal direction from the base part 36 respectively, and spring supporting parts "38b"s orthogonal to the said projecting piece parts "38a"s; the said spring supporting parts "38b"s are located in parallel to the base part 36.

The hinge shaft 13 is composed of the shaft part 31, and the planar fitting piece 32 provided at the other end part of the said shaft part 31. At one end part of the shaft part 31, a coming-out preventing projecting part 31a which projects from its outer circumference surface is provided. In the fitting piece 32, the screw inserting holes "32a"s are formed at the both side parts.

With respect to the hinge shaft 13, the shaft part 31 is inserted into the shaft inserting hole of the base part 36 of the tilt angle changing member 35, and it is freely turnably supported by the tilt angle changing member 35.

The supporting holes "37a"s of the supporting parts 37s are supported by supporting shafts 39s. Therefore, the turning supporting mechanism 34 is turnable to the first housing 11 to the shaftwise direction of the supporting shafts 39s fixed in the first housing 11.

Between the spring supporting parts "38b"s of the spring supporting pieces 38s and one surface 11a of the first housing 11, compression coil springs 40s (FIG. 23) are contractedly provided, respectively.

The fitting piece 32 of the hinge shaft 13 is fitted on the second housing 12. The fitting piece 32 is fitted on the second housing 12 by inserting fitting screws not shown into the screw inserting holes "32a"s and screwing the fitting piece 32 to the second housing 12.

In this manner, by supporting the supporting parts 37s by the supporting shaft and fitting the hinge shaft 13 on the second housing 12, the first housing 11 and the second housing 12 are turnably connected (see FIG. 23): and the portable wireless telephone set 10 is formed.

Figure 24:
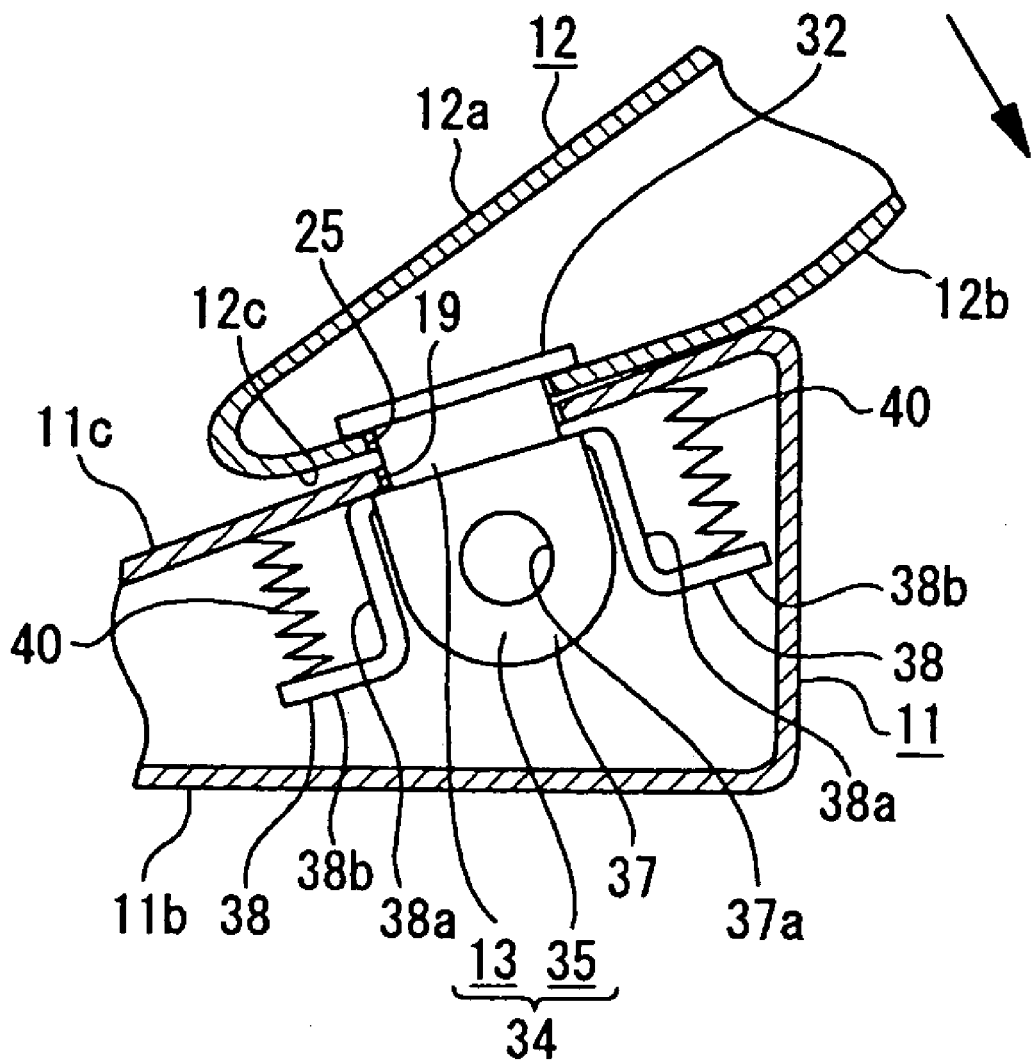
FIG. 24 is an enlarged side view showing the state where force is being given.

In the state where the first housing 11 and the second housing 12 are connected, if force is applied to either or both of the first housing 11 and the second housing 12, the tilt angle changing member 35 and the hinge shaft 13 are turned to the supporting shafts 39s (FIG. 22) in one body: one compression coil spring 40 is compressed, and the other compression coil spring 40 is stretched (see FIG. 24).

Also in the case where the turning supporting mechanism 34 is used instead of the turning supporting mechanism 26, similarly to the turning supporting mechanism 26, when force is applied to either or both of the first housing 11 and the second housing 12, the breakage of the first housing 11 and the second housing 12 can be prevented, and a separation between the first housing 11 and the second housing 12 can be prevented.

If the force being applied to either or both of the first housing 11 and the second housing 12 is removed, the compression coil springs 40s elastically return to the normal shape, and the first housing 11 and the second housing 12 return to the original tilt angle.

Next, a second embodiment will be described (see FIGS. 25 to 27).

Note that, in a portable wireless telephone set 10A described below, because different parts from the said portable wireless telephone set 10 are only that a concave part formed in the first housing and a projecting part formed in the second housing, only the different parts from the portable wireless telephone set 10 will be described in detail, and the description of the other part will be omitted by adding the same reference numerals as the reference numerals added to the same parts in the portable wireless telephone set 10.

Figure 25:
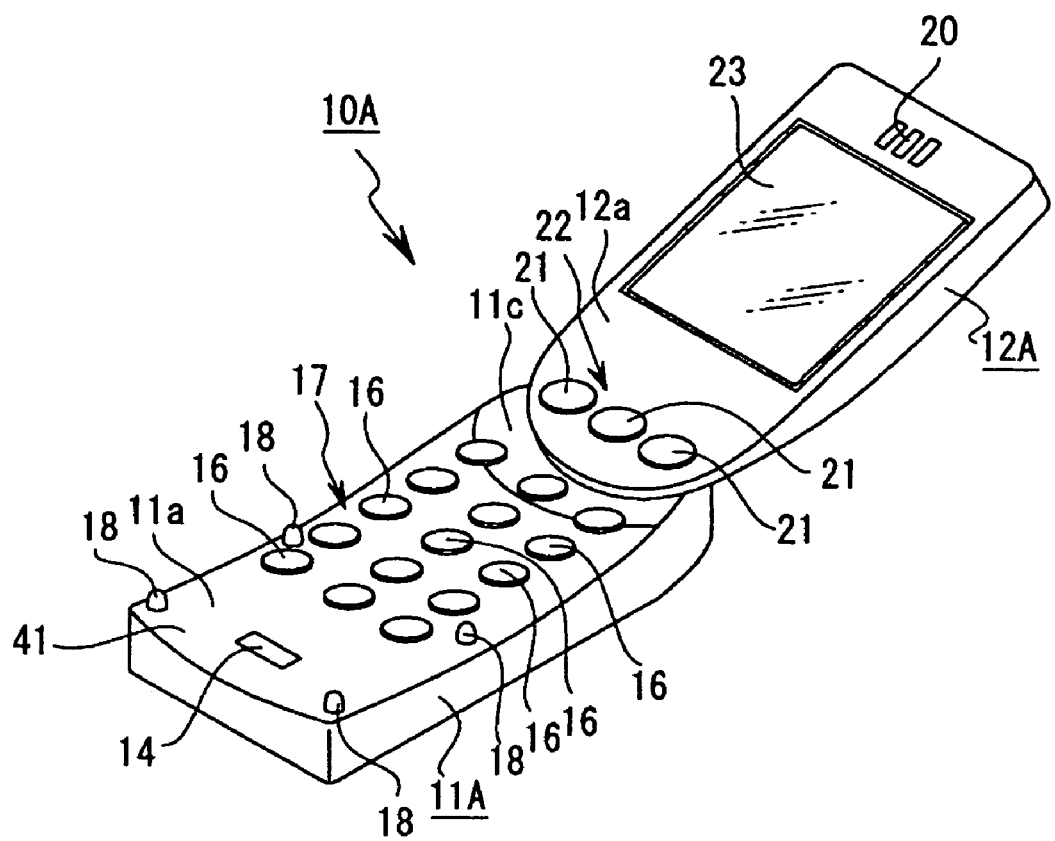
FIG. 25 is a diagram showing a second embodiment of a portable terminal device according to the present invention with FIGS. 26 and 27, and is a perspective view of a portable wireless telephone set in an open state.
Figure 26:
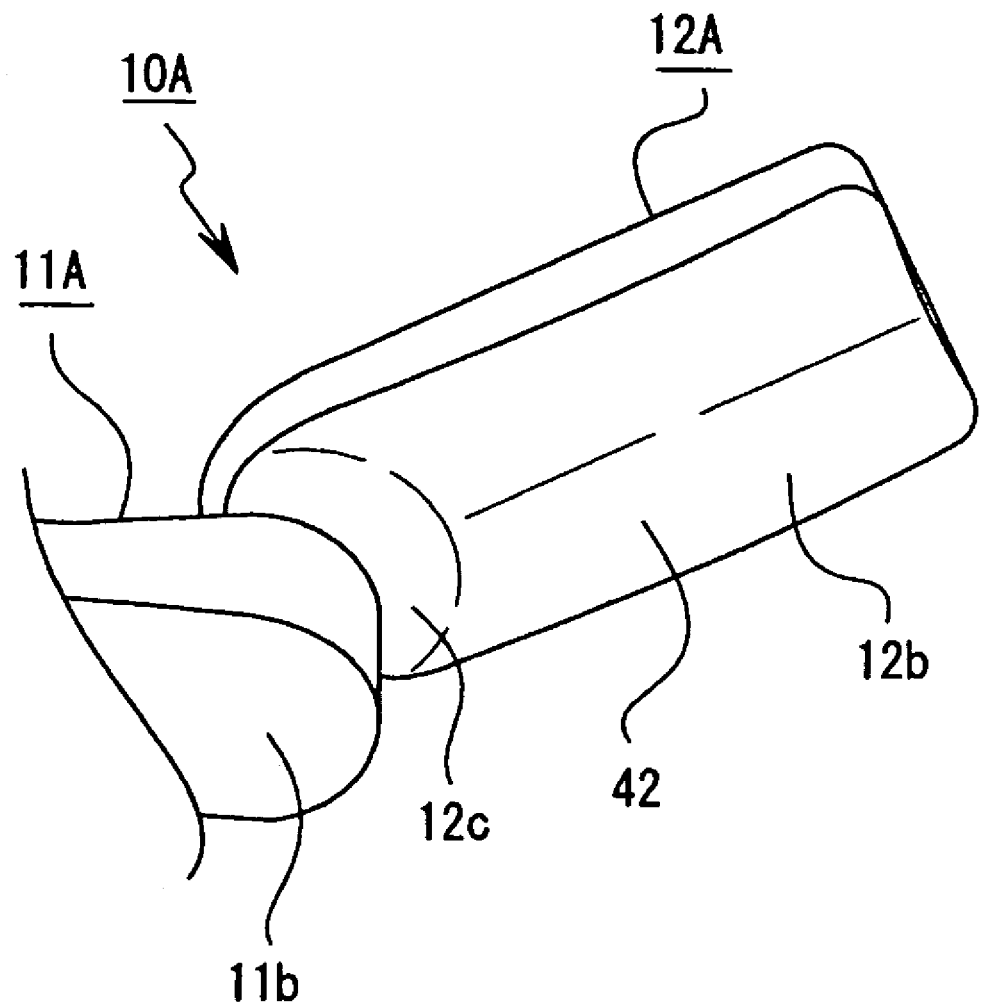
FIG. 26 is an enlarged perspective view illustrating a part of the portable wireless telephone set in the open state from a different angle from FIG. 25.
Figure 27:
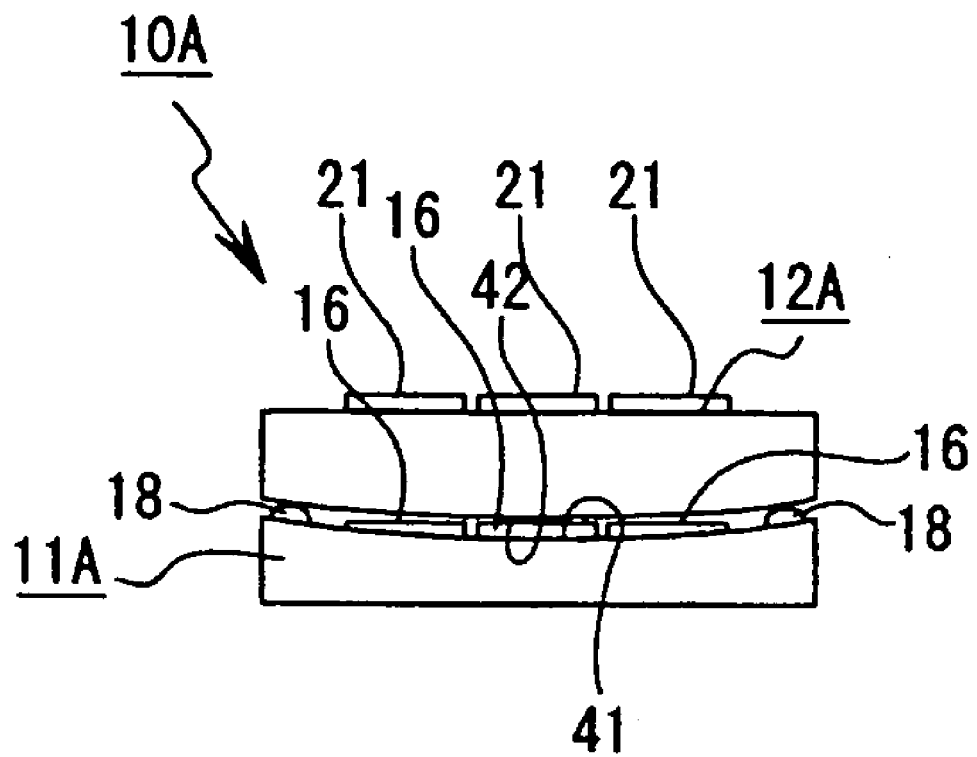
FIG. 27 is a front view of the portable wireless telephone set in a close state.

The portable wireless telephone set 10A is formed, in the state where one end part of a first housing 11A and one end part of a second housing 12A are mutually overlapped in the shaft direction of the hinge shaft 13, by that the first housing 11A and the second housing 12A are mutually turnably connected via the said hinge shaft 13 (see FIGS. 25 and 26).

At a part other than one end part of one surface 11a of the first housing 11A, that is, a part other than the slope 11c, a shallow concave part 41 in an almost spherical form is formed. Therefore, the operation keys 16s and projections 18s are provided on the concave part 41. The slope 11c is formed in a plane.

At a part other than one end part of the other surface 12b of the second housing 12A, that is, a part other than the slope 12c, a projecting part 42 in an almost peripheral shape and slightly projected is provided. The slope 12c is formed in a plane.

In an open state, the second housing 12A is tilted to the first housing 11A at a predetermined angle less than 180° (see FIGS. 25 and 26). Therefore, by tilting the second housing 12A to the first housing 11A at the predetermined angle, the portable wireless telephone set 10A becomes the shape along the outline of the caller's face when the caller performs communication, and it can get the microphone part 14 close to the caller's mouth, and can get the speaker part 20 close to the caller's ear: the usability in communication can be improved.

In the open state, if the first housing 11A is turned to the second housing 12A at 180° or the second housing 12A is turned to the first housing 11A at 180°, the portable wireless telephone set 10A becomes a close state. At this time, since the concave part 41 is formed at the part other than one end part of one surface 11a of the first housing 11A and the projecting part 42 is provided at the part other than one end part of the other surface 12b of the second housing 12A as described above, it is unnecessary to prepare a large gap in the close state between the first housing 11A and the second housing 12A to prevent the interference between both of the first housing 11A and the second housing 12A in turning: the first housing 11A and the second housing 12A can be placed to close positions in the close state (see FIG. 27). Accordingly, the portable wireless telephone set 10A can be miniaturized and can be got thinner.

Note that, it has shown the example that the projections 18s are provided in the first housing 11A in the above, however, if it is designed so that the surfaces of the operation keys 16s being the main operating part 17 are placed on the same plane as one surface 11a in the state where the operation keys 16s are not operated, the projections 18s may not be especially provided. In this case, a gap between one surface 11a of the first housing 11A and the other surface 12b of the second housing 12A in the close state can be omitted: the portable wireless telephone set 10A can be further miniaturized and can be got thinner.

Next, a third embodiment will be described (see FIGS. 28 to 33).

Note that, in a portable wireless telephone set 10B described below, because different parts from the portable wireless telephone set 10 in the aforementioned first embodiment are only that a concave part formed in the first housing and a projecting part is not formed in the second housing, only the different parts from the portable wireless telephone set 10 will be described in detail, and the description of the other part will be omitted by adding the same reference numerals as the reference numerals added to the same parts in the portable wireless telephone set 10.

Figure 28:
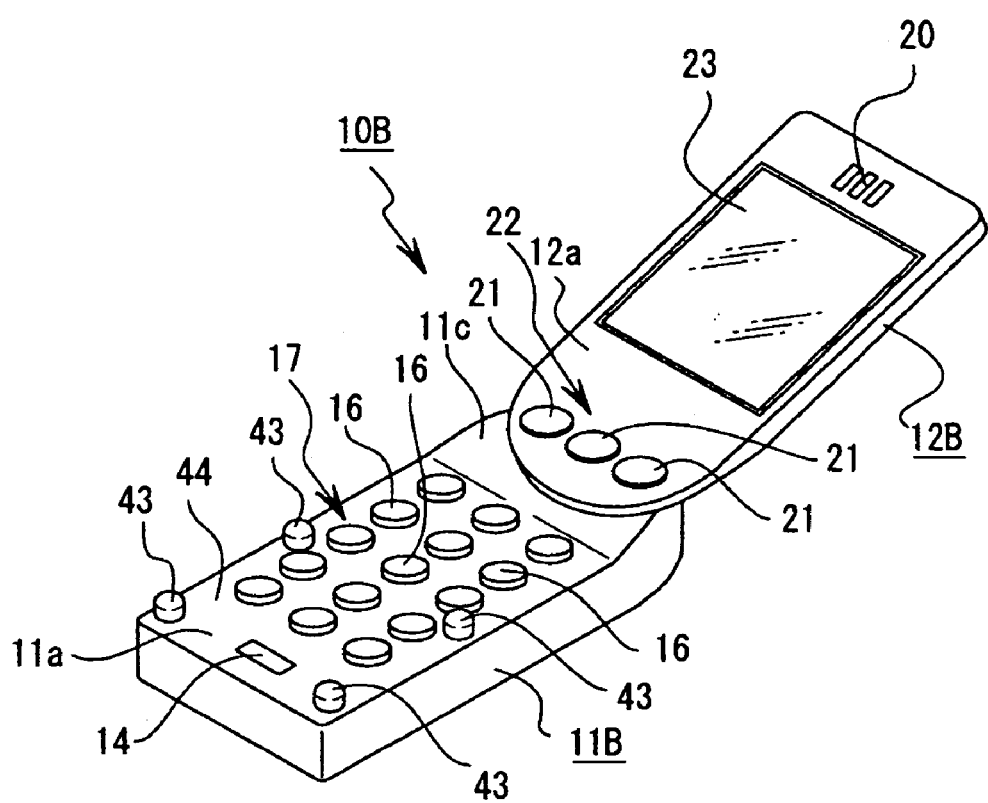
FIG. 28 is a diagram showing a third embodiment of a portable terminal device according to the present invention with FIGS. 29 to 33, and is a perspective view of a portable wireless telephone set in an open state.
Figure 29:
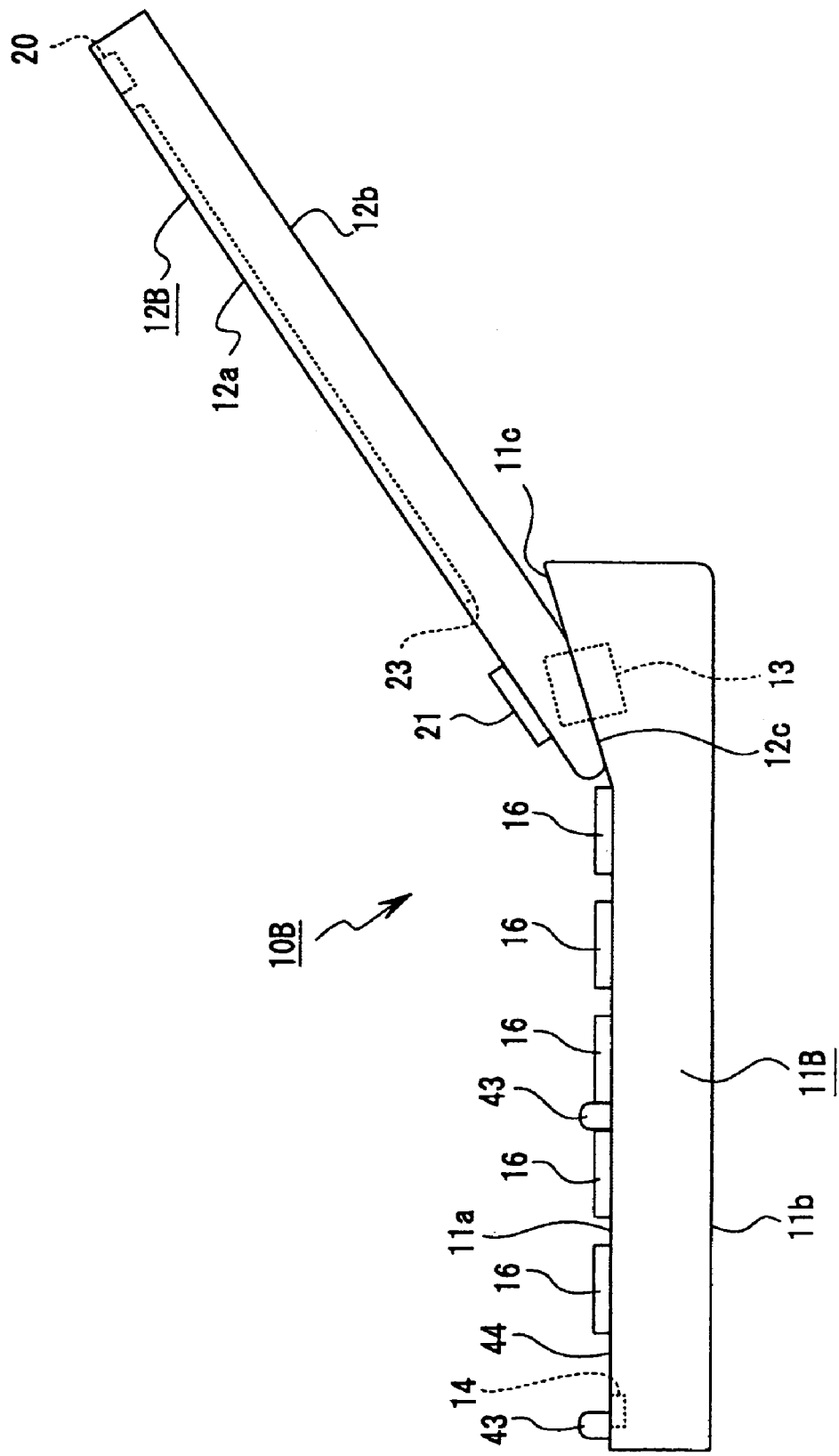
FIG. 29 is an enlarged side view of the portable wireless telephone set in the open state.
Figure 30:
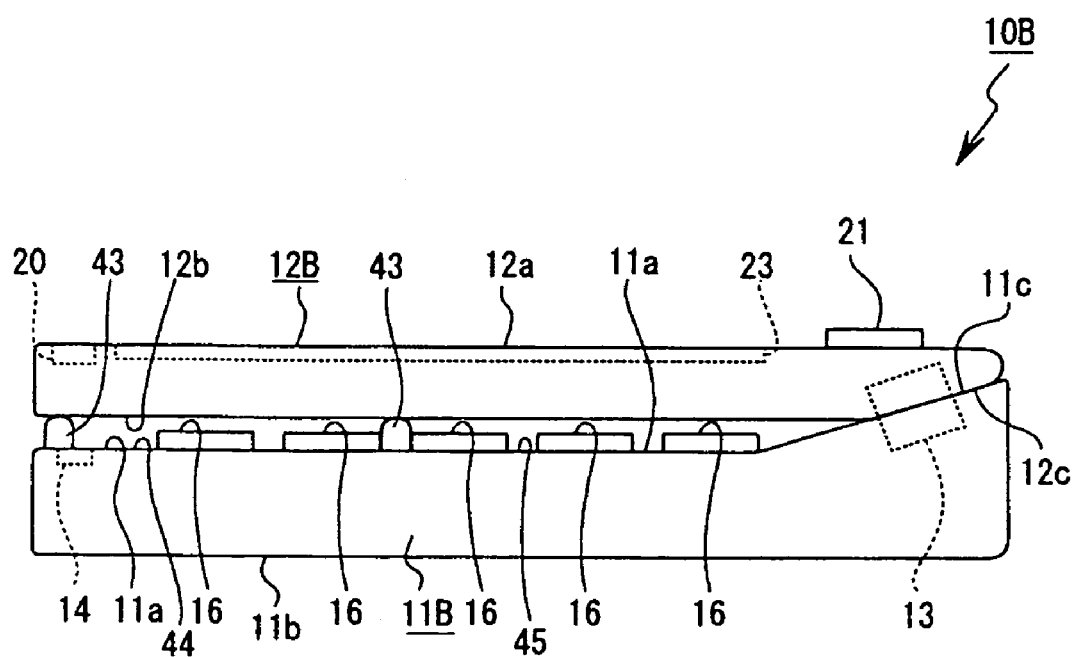
FIG. 30 is an enlarged side view of the portable wireless telephone set in a close state.

The portable wireless telephone set 10B is formed, in the state where one end part of a first housing 11B and one end part of a second housing 12B are mutually overlapped in the shaft direction of the hinge shaft 13, by that the first housing 11B and the second housing 12B are mutually turnably connected via the said hinge shaft 13 (see FIGS. 28 to 30).

On one surface 11a of the first housing 11B, both of the slope 11c and the part other than the slope 11c are formed in planes. On the both edges in the direction orthogonal to the longitudinal direction of one surface 11a, receiving projecting parts 43s are separately provided two by two in the longitudinal direction of the first housing 11B, respectively. The receiving projecting parts 43s are designed so that the tip part is formed in, for example, an almost hemispherical shape and the projection amount from one surface 11a is larger than the said projections 18s provided in the first housing 11 and the first housing 11A.

By providing the receiving projecting parts 43s in the first housing 11B, a first one surface 11a is formed as a concave part 44.

On the other surface 12b of the second housing 12B, both of the slope 12c and the part other than the slope 12c are formed in planes.

In an open state, the second housing 12B is tilted to the first housing 11B at a predetermined angle less than 180° (see FIGS. 28 and 29). Therefore, by tilting the second housing 12B to the first housing 11B at the predetermined angle, the portable wireless telephone set 10B becomes the shape along the outline of the caller's face when the caller performs communication, and it can get the microphone part 14 close to the caller's mouth and can get the speaker part 20 close to the caller's ear: the usability in communication can be improved.

Figure 31:
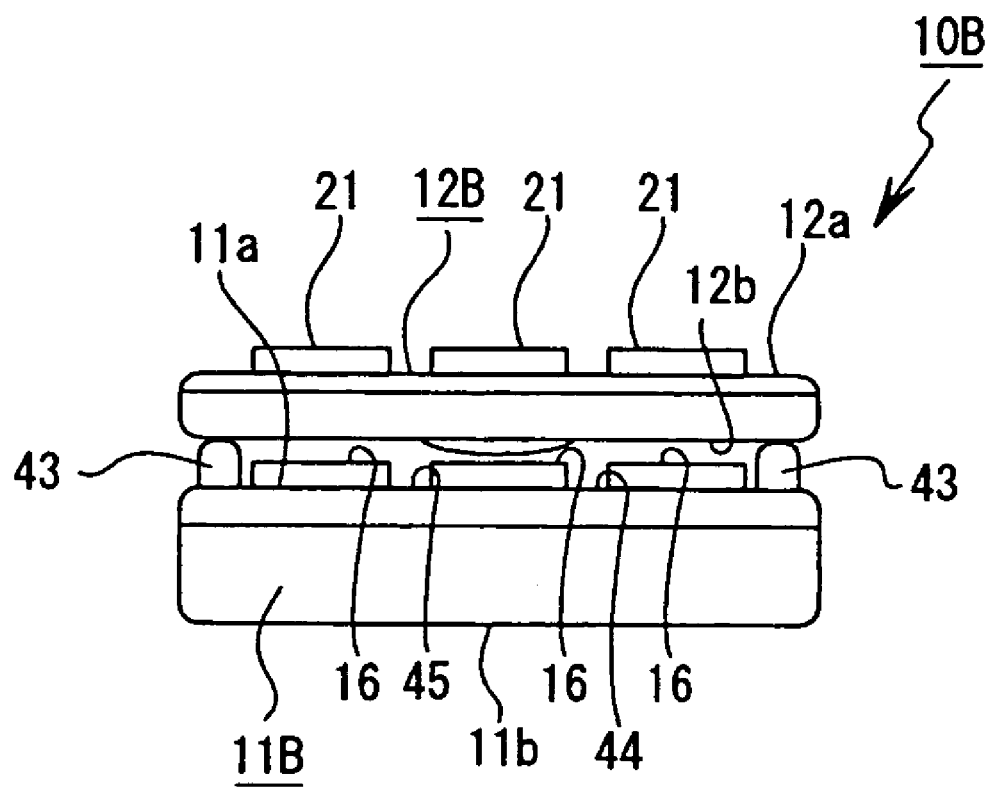
FIG. 31 is an enlarged front view of the portable wireless telephone set in the close state.

In the open state, if the first housing 11B is turned to the second housing 12B at 180° or the second housing 12B is turned to the first housing 11B at 180°, the portable wireless telephone set 10B becomes a close state (see FIGS. 30 and 31). In this close state, the second housing 12B is placed on the receiving projecting parts 43s. In the close state, a gap 45 is formed between one surface 11a of the first housing 11B and the other surface 12b of the second housing 12B, therefore, when the first housing 11B or the second housing 12B is turned, both do not interfere: a smooth turning operation can be maintained.

In the portable wireless telephone set 10B, since the gap 45 for a projection amount of the receiving projecting parts 43s from the one surface 11a is formed in the close state, the operation keys 16s can be projected from the first surface 11a within this gap 45: the operability of the operation keys 16s can be improved.

Moreover, by providing the receiving projecting parts 43s, even if force toward the first housing 11B side is applied to the second housing 12B, displacement of the second housing 12B to the first housing 11B side is controlled by the receiving projecting parts 43s: the operations of the operation keys 16s not intended by the operator can be prevented.

Furthermore, since the tip part of the receiving projecting parts 43s are formed in an almost hemispherical shape, when the first housing 11B or the second housing 12B is turned from the open state to the close state, a contacting area of the other surface 12b of the second housing 12B and the receiving projecting parts 43s is small; therefore, smooth turning operations can be maintained.

Note that, the example of that the receiving projecting parts 43s are provided two by two on the both edges of one surface 11a of the first housing 11B respectively, has shown in the above, however, the number of the receiving projecting parts 43s is not only limited to this, it is good if only the receiving projecting parts 43s are provided at least one by one on the both edges of one surface 11a.

Next, a modified example in the third embodiment will be described (see FIGS. 32 and 33).

Note that, in a portable wireless telephone set 10C described below, because a different point from the said portable wireless telephone set 10B is only that the positions of the receiving projecting parts 43 are different, only the different part from the portable wireless telephone set 10B will be described in detail, and the description of the other part will be omitted by adding the same reference numerals as the reference numerals added to the same part in the portable wireless telephone set 10B.

Figure 32:
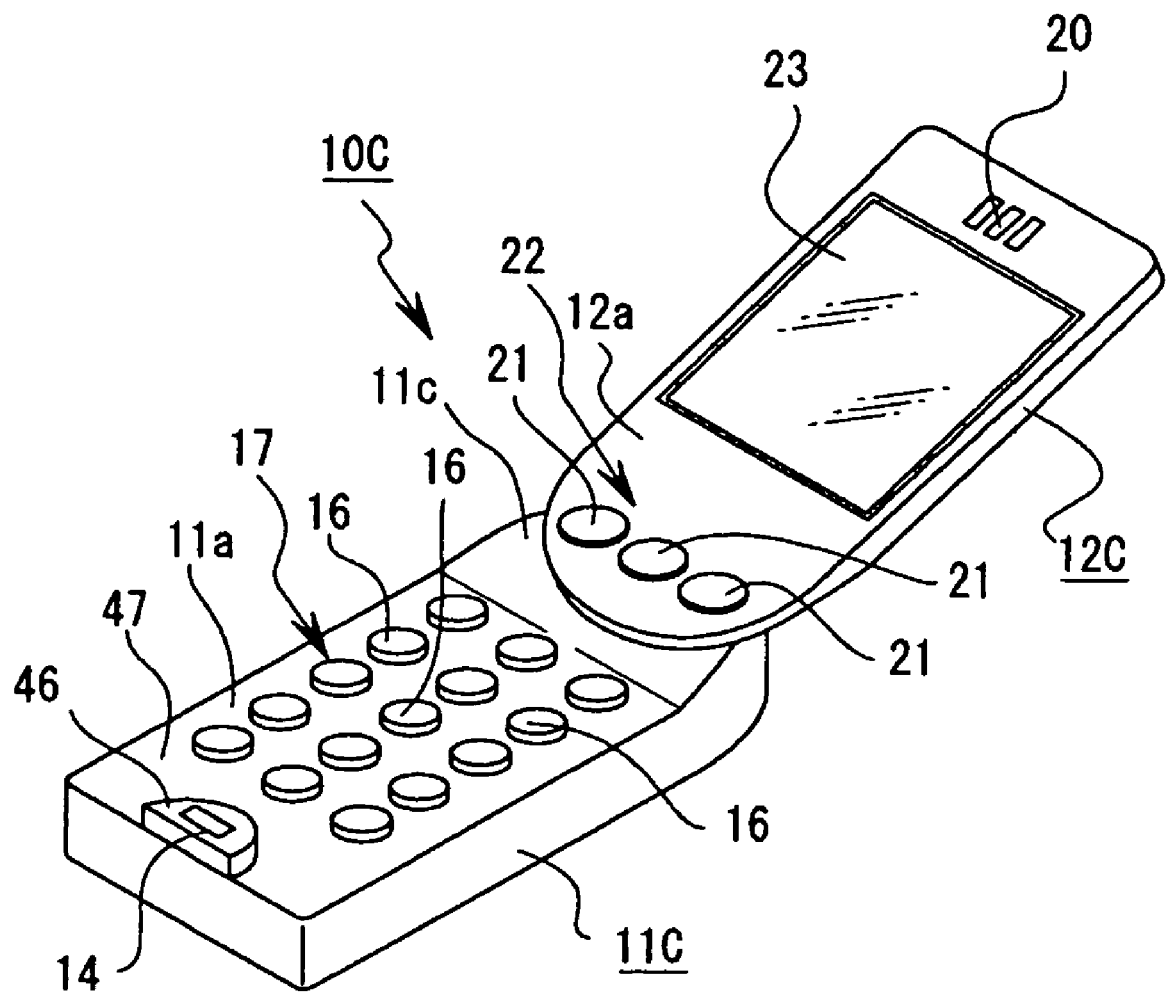
FIG. 32 is a diagram showing the modified example of the third embodiment of the portable terminal device according to the present invention with FIG. 33, and is a perspective view of a portable wireless telephone set in an open state.
Figure 33:
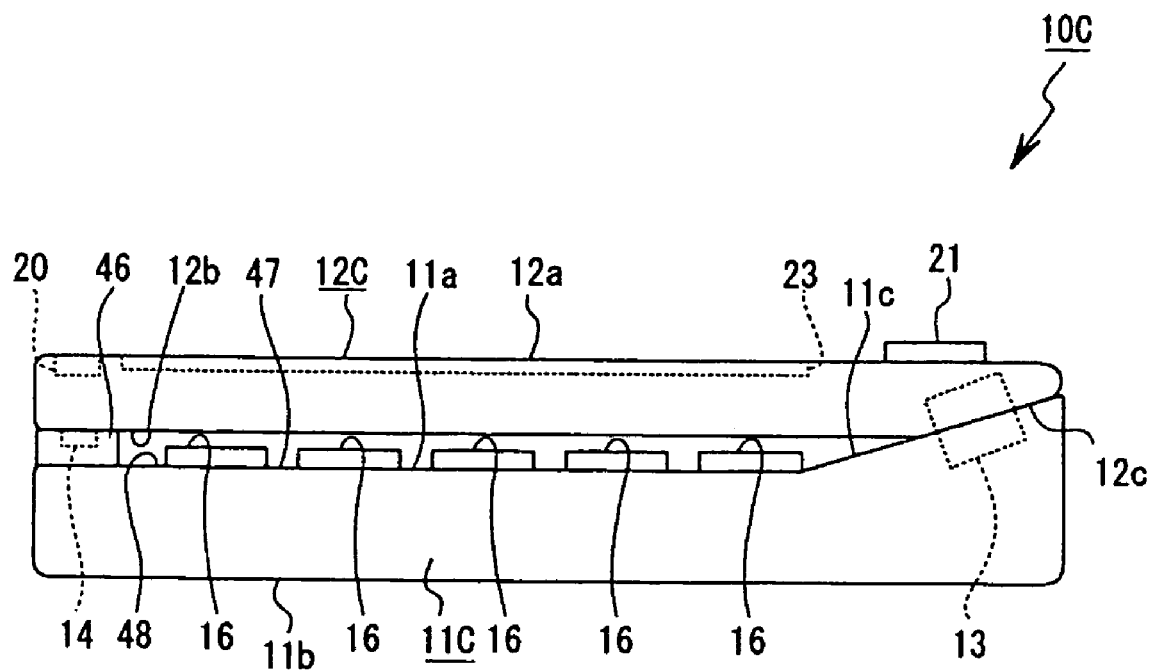
FIG. 33 is an enlarged side view of the portable wireless telephone set in a close state.

The portable wireless telephone set 10C is formed, in the state where one end part of a first housing 11C and one end part of a second housing 12C are mutually overlapped in the shaft direction of the hinge shaft 13, by that the first housing 11C and the second housing 12C are mutually turnably connected via the said hinge shaft 13 (see FIGS. 32 and 33).

On one surface 11a of the first housing 11C, both of the slope 11c and the part other than the slope 11c are formed in planes. On the edge of one end of one surface 11a in the longitudinal direction, that is, on the edge of the opposite end to the slope 11c, a receiving projecting part 46 is provided at the center part. Therefore, the microphone part 14 is formed in the receiving projecting part 46.

For instance, in the receiving projecting part 46, a surface that faces the second housing 12C in a close state is formed in a plane. The receiving projecting part 46 is designed so that the projection amount from one surface 11a is larger than the said projections 18s provided in the first housing 11 (FIG. 3) and the first housing 11A (FIG. 25).

In the first housing 11C, by providing the receiving projecting part 46, the first housing 11a is formed as a concave part 47.

On the other surface 12b of the second housing 12C, both of the slope 12c and the part other than the slope 12c are formed in planes.

In an open state, if the first housing 11C is turned to the second housing 12C at 180° or the second housing 12C is turned to the first housing 11C at 180°, the portable wireless telephone set 10C becomes the close state (see FIG. 33). In this close state, the second housing 12C is placed on the receiving projecting part 46. In the close state, a gap 46 is formed between one surface 11a of the first housing 11C and the other surface 12b of the second housing 12C, therefore, when the first housing 11C or the second housing 12C is turned, both do not interfere: a smooth turning operation can be maintained.

In a portable wireless telephone set 10C, in the close state, since a gap 48 for the projection amount that the receiving projecting part 46 is projected from the first surface 11a is formed, the operation keys 16s can be projected from the first surface 11a within this gap 48: the operability of the operation keys 16s can be improved.

Moreover, by providing the receiving projecting part 46, even if force toward the first housing 11C side is applied to the second housing 12C, displacement of the second housing 12C to the first housing 11C side is controlled by the receiving projecting part 46: the operations of the operation keys 16s not intended by the operator can be prevented.

Next, a fourth embodiment will be described (see FIGS. 34 to 37).

Note that, because a portable wireless telephone set 10D is different from the portable wireless telephone set 10 in the aforementioned first embodiment in that the part of the concave part of the first housing is different and receiving projecting parts are provided, only the different parts from the portable wireless telephone set 10 will be described in detail, and the description of the other part will be omitted by adding the same reference numerals as the reference numerals added to the same part in the portable wireless telephone set 10.

Figure 34:
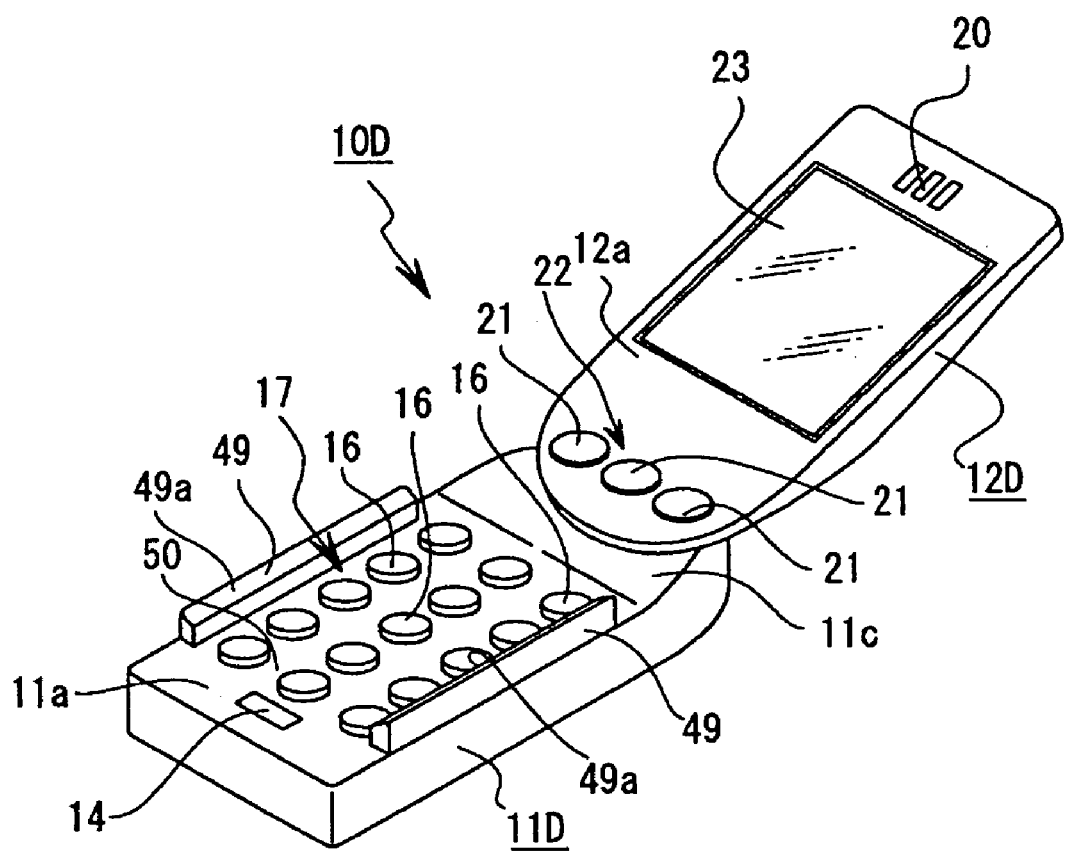
FIG. 34 is a diagram showing a fourth embodiment of a portable terminal device according to the present invention with FIGS. 35 to 37, and is a perspective view of a portable wireless telephone set in an open state.
Figure 35:
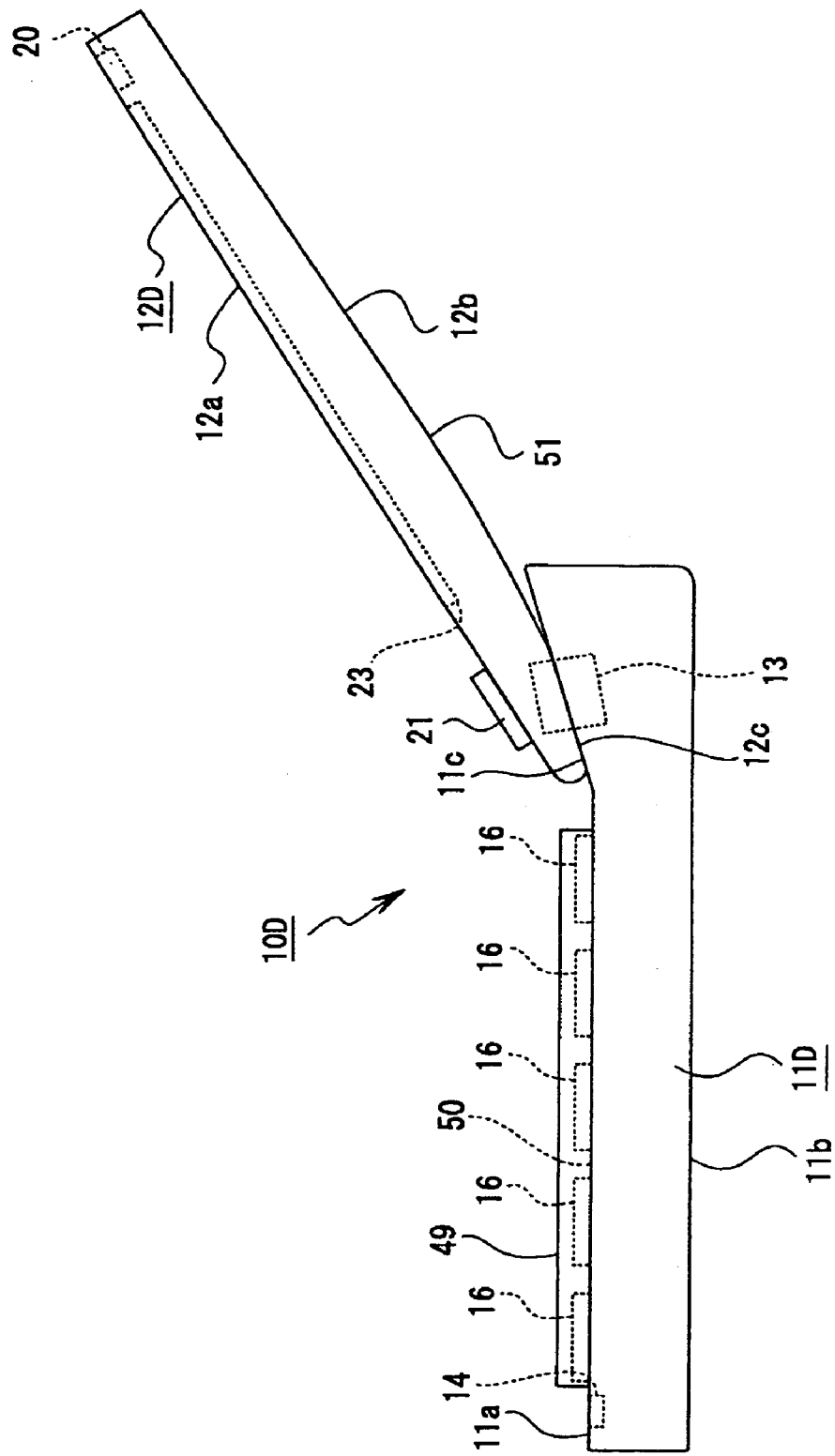
FIG. 35 is an enlarged side view of the portable wireless telephone set in the open state.
Figure 36:
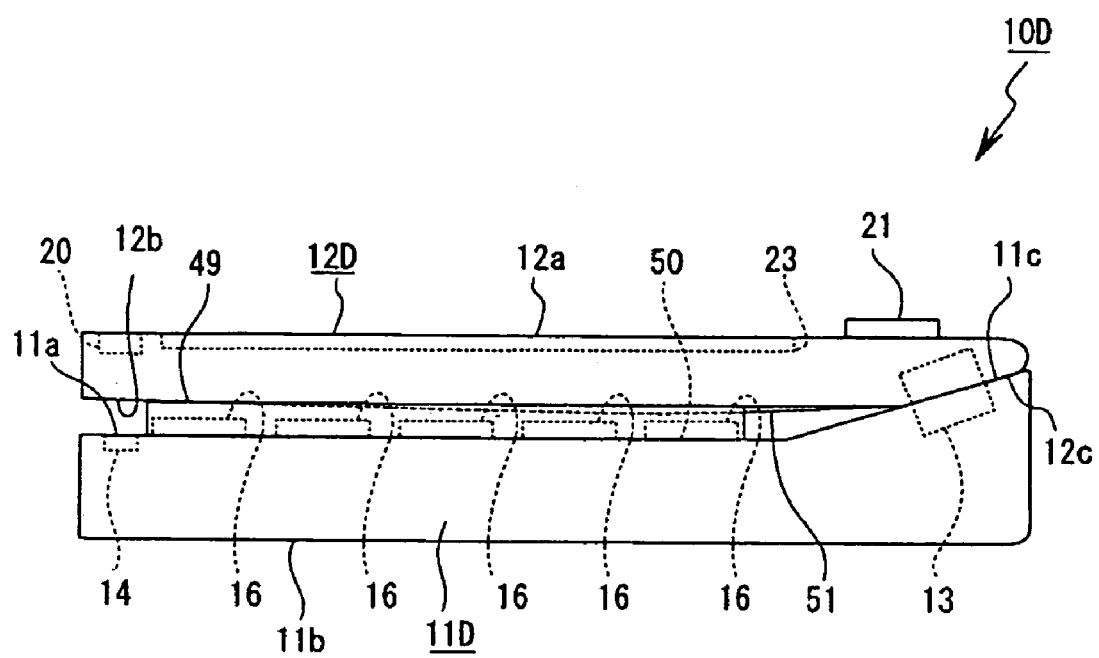
FIG. 36 is an enlarged side view of the portable wireless telephone set in a close state.

The portable wireless telephone set 10D is formed, in the state where one end part of a first housing 11D and one end part of a second housing 12D are mutually overlapped in the shaft direction of the hinge shaft 13, by that the first housing 11D and the second housing 12D are mutually turnably connected via the said hinge shaft 13 (see FIGS. 34 to 36).

On one surface 11a of the first housing 11D, both of the slope 11c and the part other than the slope 11c are formed in planes. On the both sides of the edges of one surface 11a in the direction orthogonal to the longitudinal direction of one surface 11a, receiving projecting parts 49s are separately provided in the longitudinal direction of the first housing 11D respectively so as to extend in the said longitudinal direction. In the receiving projecting parts 49s, for instance, projecting parts "49a"s of which the sides facing to the second housing 12D in a close state are almost in spheres, are formed. The receiving projecting parts 49s are designed so that the projection amount from one surface 11a is larger than the said projections 18s provided in the first housing 11 (FIG. 3) and the first housing 11A (FIG. 25).

In the first housing 11D, by providing the receiving projecting parts 49s, the one surface 11a is formed as a concave part 50.

At a part other than the slope 12c on the other surface 12b of the second housing 12D, a projecting part 51 that is almost in a spherical shape and slightly projects is provided. The slope 12c is formed in a plane.

In an open state, the second housing 12D is tilted to the first housing 11D at a predetermined angle less than 180° (see FIGS. 34 and 35). Therefore, by tilting the second housing 12D to the first housing 11D at the predetermined angle, the portable wireless telephone set 10D becomes the shape along the outline of the caller's face when the caller performs communication, and it can get the microphone part 14 close to the caller's mouth and can get the speaker part 20 close to the caller's ear: the usability in communication can be improved.

Figure 37:
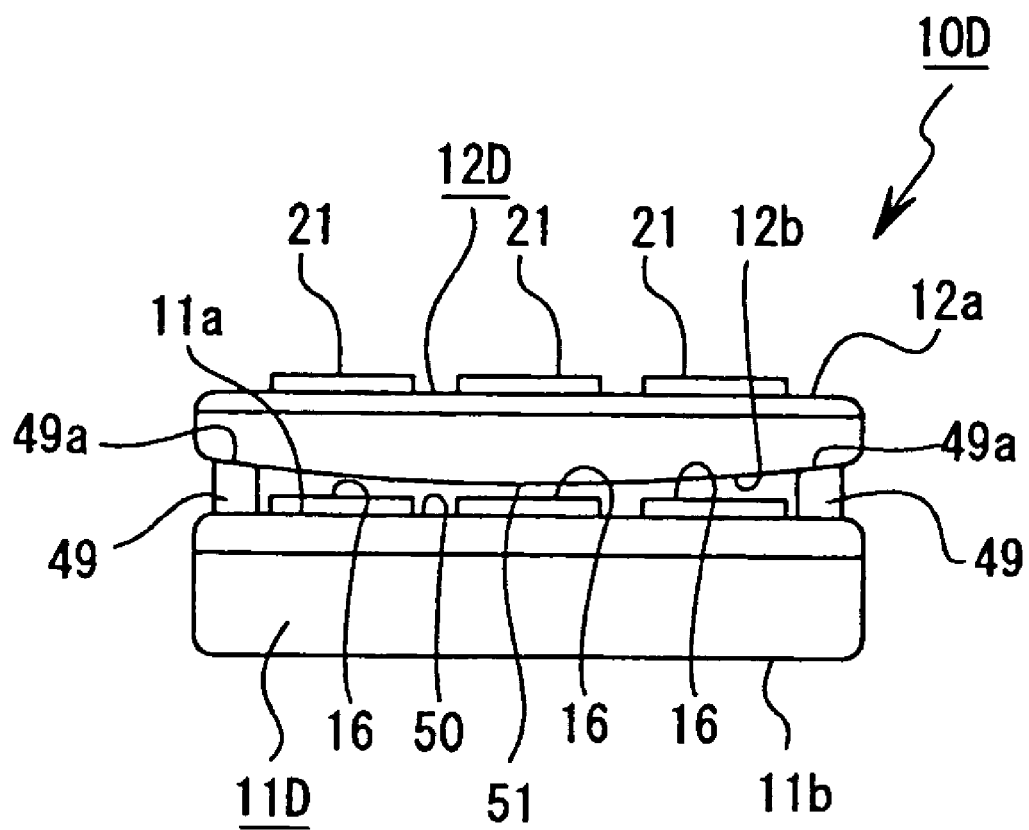
FIG. 37 is an enlarged front view of the portable wireless telephone set in the close state.
Figure 38:
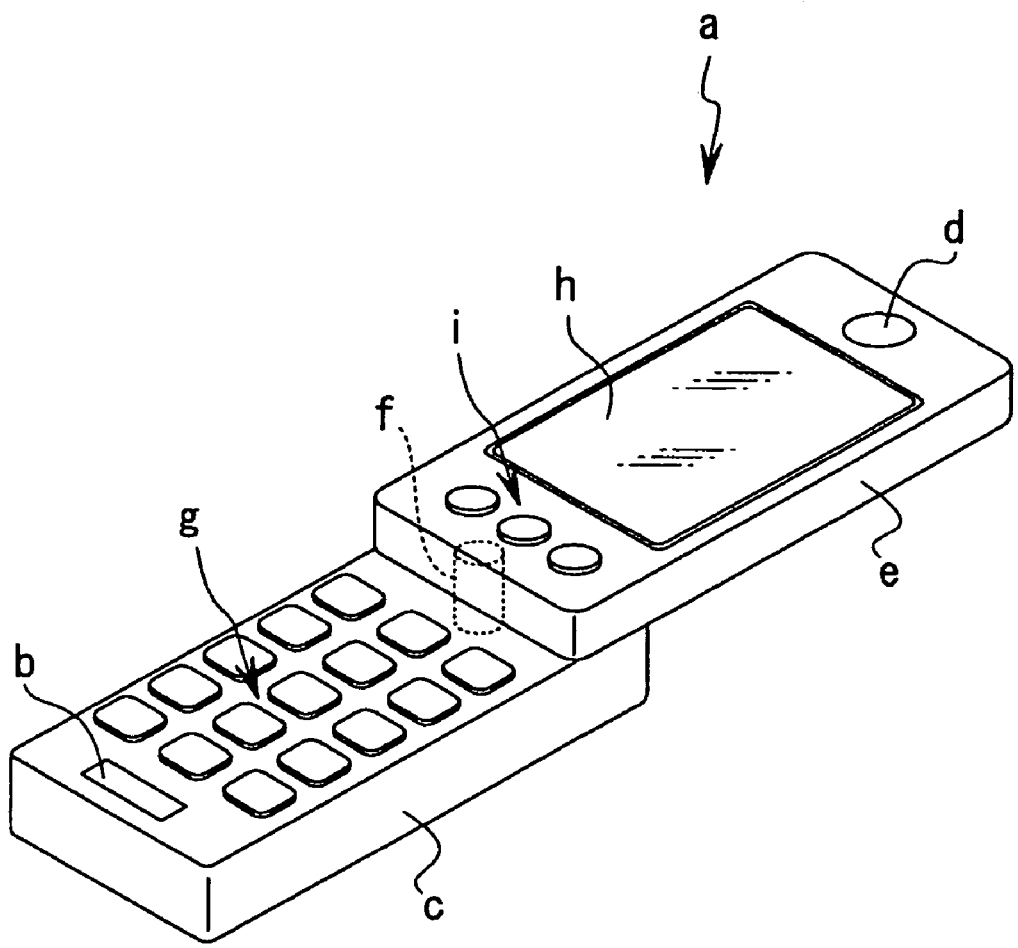
FIG. 38 is a diagram showing a portable terminal device according to the present invention with FIG. 39, and is a perspective view in an open state.
Figure 39:
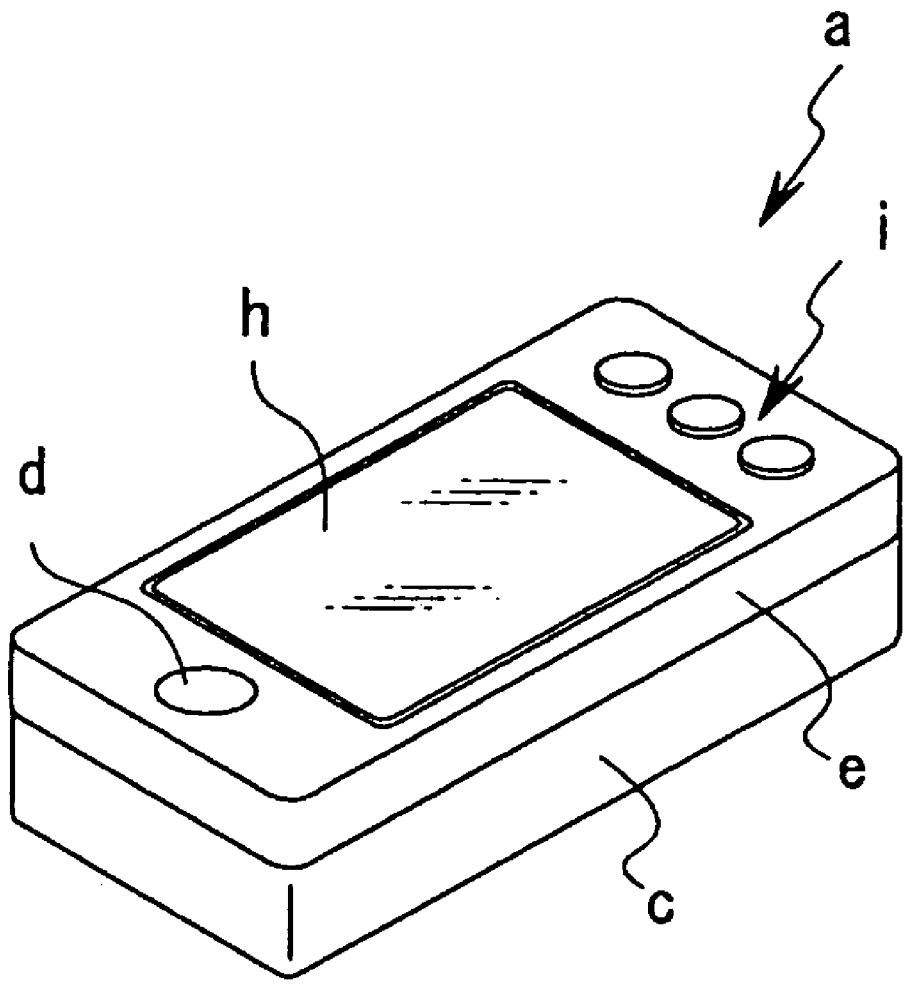
FIG. 39 is a perspective view showing a close state.
Figure 40:
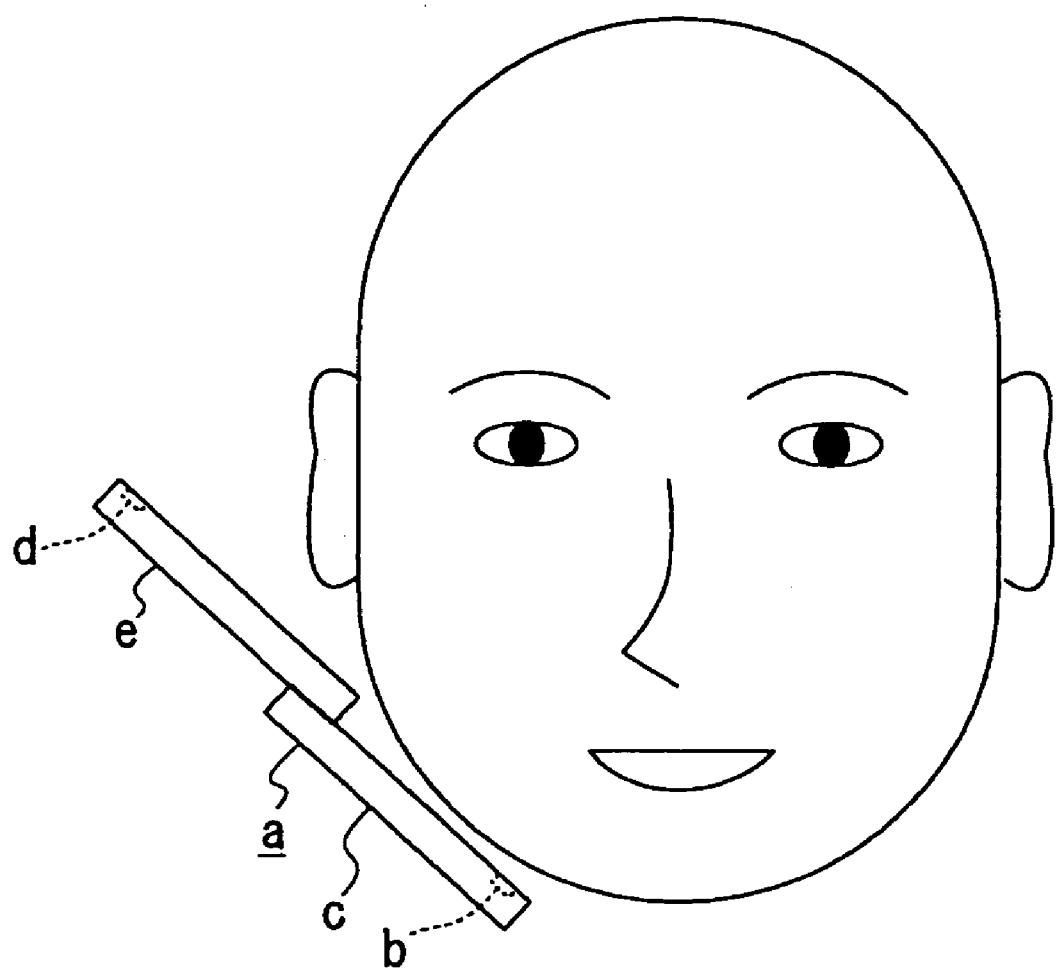
FIG. 40 is an illustration to show problems in the use of a conventional portable wireless telephone set with FIG. 41, and is an illustration showing the state where the first housing has gotten apart from user's ear.
Figure 41:
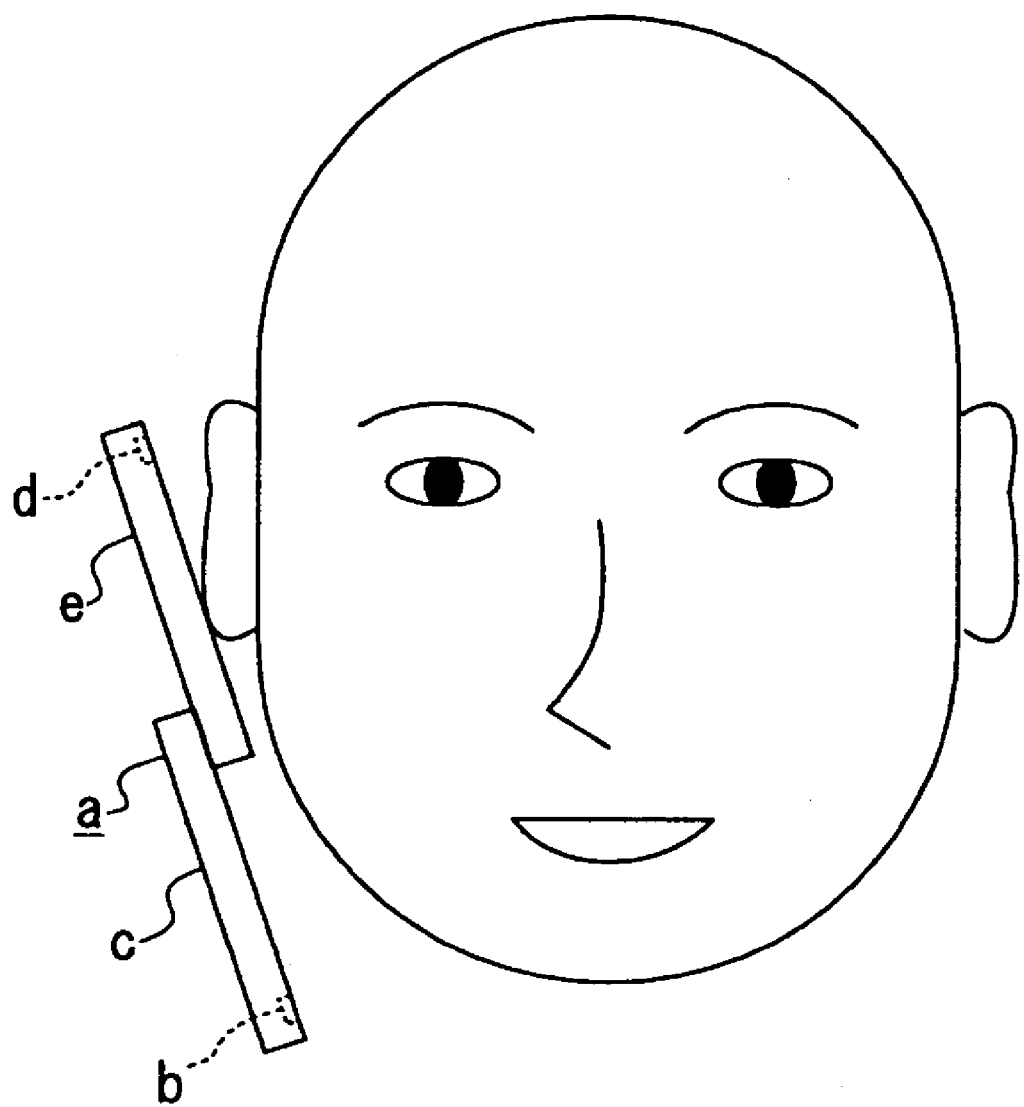
FIG. 41 is an illustration to show the state where the second housing has gotten apart from user's mouth.
Figure 42:
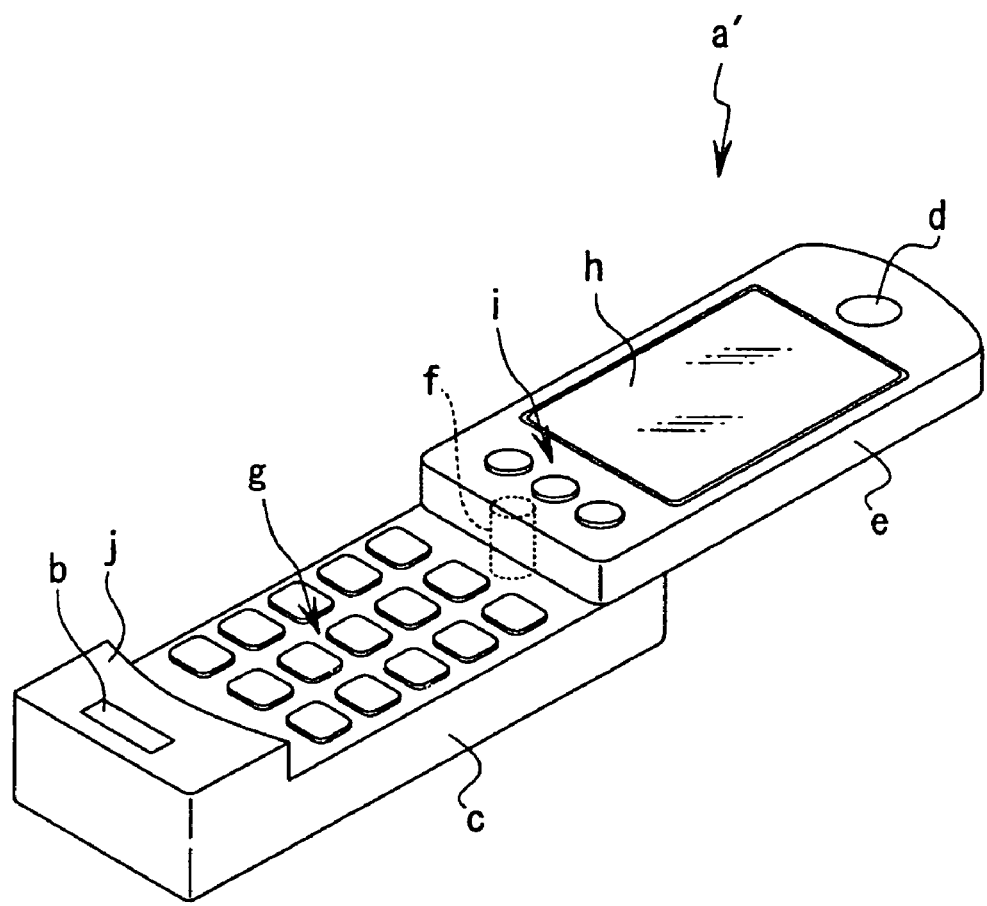
FIG. 42 is a diagram showing another conventional portable wireless telephone set with FIG. 43, and is a perspective view showing an open state.
Figure 43:
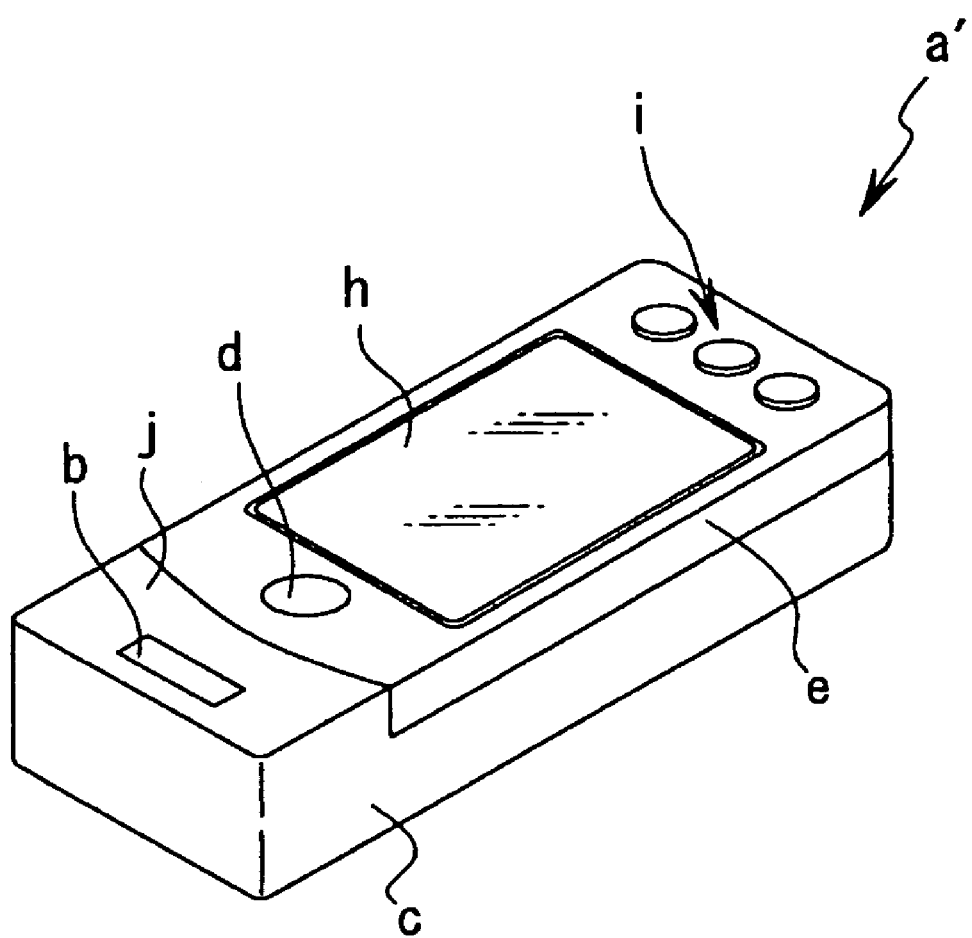
FIG. 43 is a perspective view showing a close state.
Figure 44:
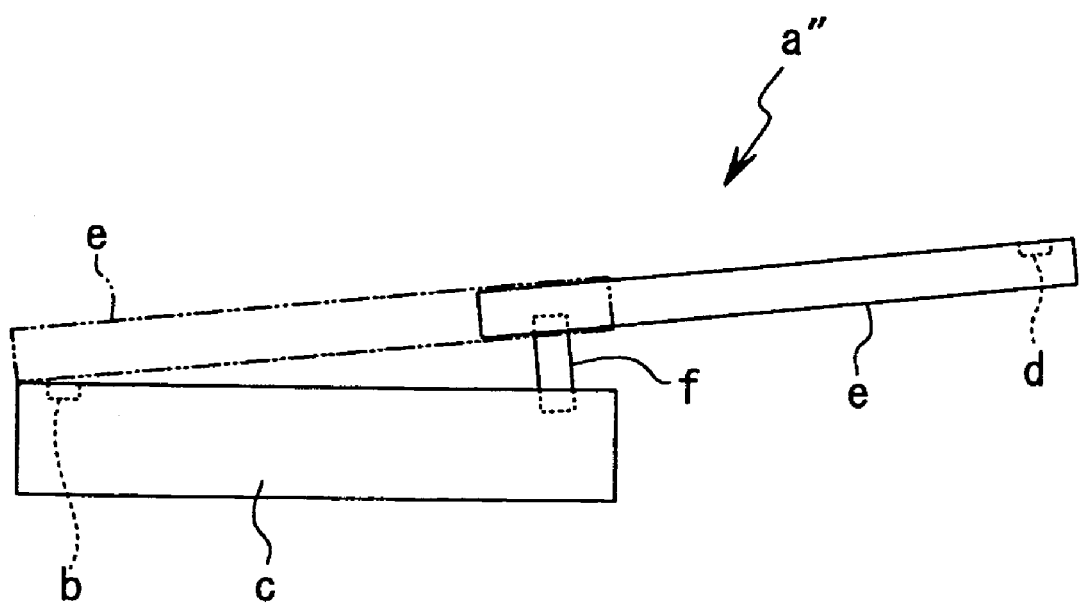
FIG. 44 is a conceptual view showing one of conventional problems.

In the open state, if the first housing 11D is turned to the second housing 12D at 180° or the second housing 12D is turned to the first housing 11D at 180°, the portable wireless telephone set 10D becomes a close state (see FIGS. 36 and 37). At this time, since the concave parts 49s are formed on the receiving projecting parts 49s provided in the first housing 11D, and the projecting part 51 is provided at the part other than one end part of the other surface 12b of the second housing 12D as described above, it is unnecessary to prepare a large gap between the first housing 11D and the second housing 12D to prevent the interference between them when the first housing 11D or the second housing 12D is turned: the first housing 11D and the second housing 12D can be placed at close positions in the close state (see FIG. 37). Accordingly, the portable wireless telephone set 10D can be miniaturized and can be got thinner.

Moreover, since the receiving projecting parts 49s are provided in the first housing 11D, even if force toward the first housing 11D side is applied to the second housing 12D, displacement of the second housing 12D to the first housing 11D side is controlled by the receiving projecting parts 49s: the operations of the operation keys 16s not intended by the operator can be prevented.

Note that, the example of that the receiving projecting parts 49s are provided on the both sides of the edges of one surface 11a of the first housing 11D respectively, has shown in the above, however, in addition to this, also the receiving projecting part 49 may be provided on the edge of the end of the first housing 11D in the longitudinal direction.

In the aforementioned third and fourth embodiments, the receiving projecting parts 43s of which the tip part is formed in an almost hemispherical shape, the receiving projecting part 46 of which the top surface is formed in a plane, and the receiving projecting parts 49s of which the top surface is formed in an almost spherical shape have been exemplified, however, these shapes of each receiving projecting part are not only limited to them but also it can be properly changed to a concave shape such as an almost sphere, a plane, and a projecting almost sphere.

Furthermore, the examples of that the respective concave parts 15, 41 of the first housings 11, 11A and the respective projecting parts 24, 42, 51 of the second housings 12, 12A, 12D are formed in almost spheres have shown in the above, however, for instance, also they can be formed in a shape similar to the circumferential surface of a cone.

Also the concave parts 49a of the receiving projecting part 49 provided in the second housing 12D may be formed, for example, in a shape similar to the circumferential surface of a cone.

Additionally, also in the portable wireless telephone sets 10A, 10B, 10C, 10D in the aforementioned first embodiment to the fourth embodiments, one of the turning supporting mechanisms 26, 26A, 34 described in the first embodiment can be used.

Both of the concrete shape and configuration of each part shown in the aforementioned embodiments are only examples of the embodiments according to the present invention, and they should not be limitedly construed as the technical scope of the present invention.

As it is obvious from the above description, the portable terminal device according to the present invention is characterized in that, in a portable terminal device in which one end part of a first housing having an operating part and one end part of a second housing having a display part are turnably connected by a hinge part, the first housing or the second housing is turned by the hinge part from a close state where the first housing and the second housing are overlapped with each other and the surface having the operating part and the surface having the display part are facing to the same direction, and an open state where the display part surface and the operating part surface are opened at a predetermined angle is formed, and the hinge part has tilt angle changing means that is tiltably supported by the first housing or the second housing and can change the angle in the open state.

Therefore, in the state where the open state that the first housing and the second housing mutually are tilted via the hinge part is formed, even if load is charged on the first housing and the second housing, the angle formed by the first housing and the second housing in the said open state can be changed by the tilt angle changing means, thereby, the breakage of the first housing and the second housing by the said load can be prevented, and a separation between the first housing 11 and the second housing 12 can be prevented.

In the invention according to claim 2, a suboperating part having a predetermined key is provided on the same surface as the display part surface, so that in both of the open state and the close state, the user can perform a predetermined operation via the operating part or the suboperating part while confirming the display on the display part.

In the invention according to claim 3, the second housing is formed so that one end part has a speaker part and the other end part becomes thinner as the position is further from the speaker part, thereby, in the open state, there is no gap between the first housing and the second housing, thereby, the user can operate the operating part provided on the second housing by slipping the finger of the hand holding the first housing from the first housing to the second housing: the operability can be improved.

In the invention according to claim 4, the angle formed by the display part surface and the operating part surface in the open state is designed to be less than 180°; thereby, in the open state, the portable wireless telephone set becomes the shape along the outline of the caller's face when the caller performs communication, and it can get the microphone part close to the caller's mouth and can get the speaker part close to the caller's ear: the usability in communication can be improved.

In the invention according to claim 5, since a concave part opened to the second housing side in the close state is formed at least at a part of the operating part surface of the first housing, in the case where operation keys are arranged on the said concave part, it is unnecessary to prepare a large gap between the first housing and the second housing in the close state; therefore, a portable terminal device can be miniaturized.

In the invention according to claim 6, since a concave part in an almost spherical shape is formed at one end part of the first housing, and a projecting part in an almost spherical shape facing to the concave part in the close state is provided at one end part of the second housing, when the first housing or the second housing is turned to the second housing or the first housing, the interference between the first housing and the second housing can be prevented: smooth turning operation between both can be maintained.

Moreover, it is unnecessary to place both widely apart for the purpose of the prevention of the interference between the first housing and the second housing: a portable terminal device can be miniaturized.

In the invention according to claim 7, a concave part in an almost spherical shape is formed at a part other than one end part of the first housing, and a projecting part in an almost spherical shape facing to the concave part in the close state is provided at a part other than one end part of the second housing, so that when the first housing or the second housing is turned to the second housing or the first housing, the interference between the first housing and the second housing can be prevented: smooth turning operation between both can be maintained.

Moreover, it is unnecessary to place both widely apart for the purpose of the prevention of the interference between the first housing and the second housing: a portable terminal device can be miniaturized.

In the invention according to claim 8, at least at a part of the outer circumferential edge of the operating part surface of the first housing, a receiving projecting part which is projecting to the second housing side and is abutted on or is close to the said second housing in the close state is provided, thereby, even if force toward the first housing side is applied to the second housing in the close state, the operation keys arranged on the first housing are not depressed by the first housing: the operations of the operation keys not intended by the user can be prevented.

In the invention according to claim 9, receiving projecting parts are provided at the end parts of the both sides of the first housing, thereby, even if force toward the first housing side is applied to the second housing in the close state, especially, a tilt of the second housing to the first housing in the direction connecting the end parts of the both sides can be prevented.

In the invention according to claim 10, a receiving projecting part is provided at the edge part of the other end part of the first housing, thereby, even if force toward the first housing side is applied to the second housing in the close state, especially, a tilt of the second housing to the first housing in the direction connecting one end part and the other end part of the first housing can be prevented.

Furthermore, the number of the receiving projecting parts can be reduced.

In the invention according to claim 11, a concave part of which the surface facing to the second housing in the close state is in an almost spherical shape is formed in a receiving projecting part, and a projecting part in an almost spherical shape that faces to the concave part in the close state is provided in the second housing, thereby, when the first housing or the second housing is turned to the second housing or the first housing, the interference between the first housing and the second housing can be prevented: smooth turning operation between both can be maintained.

Moreover, it is unnecessary to place both widely apart for the purpose of the prevention of the interference between the first housing and the second housing: a portable terminal device can be miniaturized.

In the invention according to claim 12, the end part of the receiving projecting part on the side that faces to the second housing in the close state is formed in an almost hemispherical shape, thereby, when the first housing or the second housing is turned from the open state to the close state, a contacting area of the second housing to the receiving projecting parts is small; therefore, smooth turning operations of the first housing and the second housing can be maintained.

In the invention according to claim 13, plural receiving projecting parts are separately provided in the circumferential direction of the outer circumferential edge of the first housing, thereby, even if force toward the first housing side is applied to the second housing in the close state, a resistance to the said force is large: the operations of the operation keys not intended by the user can be prevented.

INDUSTRIAL UTILIZATION

A portable terminal device according to the present invention will be applied to a portable wireless telephone set in which a first housing and a second housing are connected via a hinge shaft in turnable to the shaftwise direction of the said hinge shaft.

The invention claimed is:

1. A portable terminal device comprising:
  a tilt angle support to hold a sloped portion of a first housing and a sloped portion of a second housing at a predetermined angle with respect to one another, the tilt angle support including:
    a base attached to the first housing and bent to have a supporting portion substantially aligned with the first housing sloped portion; and
    a hinge part having a planar piece attached to the second housing and substantially aligned with the second housing sloped portion, and having a shaft part rotatable in the base,
  wherein: if said first housing or said second housing is turned by said hinge part from a close state where said first housing and said second housing are overlapped with each other and an operating part surface having said operating part and a display part surface having said display part are facing to the same direction, to an open state where said display part surface and said operating part surface are opened at the predetermined angle.

2. The portable terminal device according to claim 1, wherein said second housing has a suboperating part having predetermined keys on the same surface as said display part surface.

3. The portable terminal device according to claim 1, wherein said second housing has a speaker part at the other end part of said second housing, and said one end part is formed so as to be thinner as the position is further from said speaker part.

4. The portable terminal device according to claim 1, wherein said angle formed by said display part surface and said operating part surface in said open state is less than 180°.

5. The portable terminal device according to claim 1, wherein in said close state, a concave part opened to the second housing side is formed at least at a part of said operating part surface of said first housing.

6. The portable terminal device according to claim 5, wherein:
- said concave part is formed in an almost spherical shape at said one end part of said first housing; and
- in said close state, a projecting part in an almost spherical shape facing to said concave part is provided at said one end part of said second housing.

7. The portable terminal device according to claim 5, wherein:
- said concave part is formed in an almost spherical shape at a part other than said one end part of said first housing; and
- in said close state, a projecting part in an almost spherical shape facing to said concave part is provided at a part other than said one end part of said second housing.

8. The portable terminal device according to claim 1, wherein at least at a part of an outer circumferential edge of said operating part surface of said first housing, a receiving projecting part which is projected to said second housing side and is abutted on or is close to said second housing in said close state.

9. The portable terminal device according to claim 8, wherein said receiving projecting parts are provided at edge parts of the both sides of said first housing.

10. The portable terminal device according to claim 9, wherein in said close state, an end part of said receiving projecting part on a side facing to said second housing is formed in an almost hemispherical shape.

11. The portable terminal device according to claim 8, wherein said receiving projecting part is provided at an edge part of the other end part of said first housing.

12. The portable terminal device according to claim 8, wherein:
- in said receiving projecting part, a concave part of which a surface facing to said second housing in said close state is formed in an almost spherical shape is formed; and
- in said second housing, a projecting part in an almost spherical shape that faces to said concave part in said close state is provided.

13. The portable terminal device according to claim 8, wherein a plurality of said receiving projecting parts are separately provided in a circumferential direction of said outer circumferential edge in said first housing.

* * * * *